US012718427B2

(12) United States Patent
Pereira et al.

(10) Patent No.: US 12,718,427 B2
(45) Date of Patent: Aug. 25, 2026

(54) DIFFUSION-BASED IMAGE SYNTHESIS WITH DEFECT BLENDING VIA FEATURE-LEVEL OPTIMIZATION

(71) Applicant: Robert Bosch GmbH, Stuttgart (DE)

(72) Inventors: Marcus A. Pereira, Lubbock, TX (US); Wan-Yi Lin, Wexford, PA (US); Chaithanya Kumar Mummadi, Coraopolis, PA (US); Ru-Yu Wang, Leonberg (DE)

(73) Assignee: Robert Bosch GmbH (DE)

( * ) Notice: Subject to any disclaimer, the term of this patent is extended or adjusted under 35 U.S.C. 154(b) by 62 days.

(21) Appl. No.: 18/974,533

(22) Filed: Dec. 9, 2024

(65) Prior Publication Data

US 2026/0162315 A1 Jun. 11, 2026

(51) Int. Cl.

| | |
|---|---|
| ***G06T 5/60*** | (2024.01) |
| ***G06T 5/70*** | (2024.01) |
| ***G06T 7/00*** | (2017.01) |
| ***G06T 7/11*** | (2017.01) |
| ***G06T 11/00*** | (2006.01) |

(52) U.S. Cl.

CPC ................ *G06T 11/00* (2013.01); *G06T 5/60* (2024.01); *G06T 5/70* (2024.01); *G06T 7/0004* (2013.01); *G06T 7/11* (2017.01); *G06T 2207/20081* (2013.01); *G06T 2207/20084* (2013.01); *G06T 2207/30136* (2013.01); *G06T 2207/30164* (2013.01)

(58) Field of Classification Search

CPC ................ G06T 5/70; G06T 5/60; G06T 7/11

See application file for complete search history.

(56) References Cited

U.S. PATENT DOCUMENTS

| | | | |
|---|---|---|---|
| 2020/0058126 | A1 | 2/2020 | Wang |
| 2023/0067841 | A1 | 3/2023 | Saharia |
| 2023/0360182 | A1 | 11/2023 | Fanello |
| 2024/0135572 | A1 | 4/2024 | Singh |
| 2024/0135613 | A1 | 4/2024 | Ding |
| 2024/0161468 | A1 | 5/2024 | Li |

(Continued)

OTHER PUBLICATIONS

Robin Rombach et al., "High-Resolution Image Synthesis with Latent Diffusion Models." CVPR 2022, pp. 10684-10695.

(Continued)

*Primary Examiner* — Matthew Salvucci

(74) *Attorney, Agent, or Firm* — Dickinson Wright PLLC

(57) ABSTRACT

A computer-implemented method generates a synthetic image with a blended defect, combining a first and second defect. A target feature map is created by merging masked feature maps derived from source images displaying the respective defects. These feature maps are generated using a machine learning model during a forward diffusion process. A noisy latent representation is obtained from an input image via another forward diffusion process. A new latent representation is then created through reverse diffusion, involving: (i) minimizing an energy function that compares a masked current feature map with the target feature map, (ii) predicting noise in the current iteration via the machine learning model, and (iii) updating the latent representation. The final synthetic image is produced by decoding the updated latent representation.

20 Claims, 11 Drawing Sheets

(56) References Cited

U.S. PATENT DOCUMENTS

| | | | | |
|---|---|---|---|---|
| 2024/0169499 | A1 | 5/2024 | Agarwal | |
| 2024/0169622 | A1 | 5/2024 | Xie | |
| 2024/0169623 | A1 | 5/2024 | Zeng | |
| 2024/0320789 | A1 | 9/2024 | Hinz | |
| 2024/0320872 | A1 | 9/2024 | Hinz | |
| 2024/0320873 | A1 | 9/2024 | Hinz | |
| 2024/0331322 | A1 | 10/2024 | Smith | |
| 2024/0355022 | A1 | 10/2024 | Shi | |
| 2025/0022099 | A1 | 1/2025 | Song | |
| 2025/0124544 | A1 | 4/2025 | Park | |
| 2025/0166133 | A1 | 5/2025 | Kahatapitiya | |
| 2025/0166307 | A1 | 5/2025 | Gadelha | |
| 2025/0166367 | A1 | 5/2025 | Dorkenwald | |
| 2025/0241512 | A1 | 7/2025 | Huang | |
| 2025/0292445 | A1 | 9/2025 | Vembar | |
| 2025/0308081 | A1 | 10/2025 | Yuan | |
| 2025/0308113 | A1* | 10/2025 | Revanur | G06T 11/10 |
| 2025/0315999 | A1 | 10/2025 | Jiang | |
| 2025/0322561 | A1 | 10/2025 | Ungureanu-Contes | |
| 2025/0328997 | A1* | 10/2025 | Zhou | G06T 5/77 |
| 2025/0336043 | A1 | 10/2025 | Vasconcelos | |
| 2025/0356540 | A1 | 11/2025 | Djelouah | |
| 2026/0017758 | A1 | 1/2026 | Zhang | |
| 2026/0030825 | A1 | 1/2026 | Maros | |
| 2026/0051087 | A1 | 2/2026 | Kuen | |
| 2026/0087603 | A1 | 3/2026 | Kreis | |
| 2026/0094404 | A1 | 4/2026 | Feldman | |
| 2026/0105670 | A1 | 4/2026 | Wang | |
| 2026/0134598 | A1 | 5/2026 | Nadar | |

OTHER PUBLICATIONS

Nataniel Ruiz et al. "DreamBooth: Fine Tuning Text-to-Image Diffusion Models for Subject-Driven Generation." CVPR 2023, pp. 22500-22510.

Bahjat Kawar et al., "Imagic: Text-Based Real Image Editing with Diffusion Models." CVPR 2023, pp. 6007-6017.

Ashish Vaswani et al., "Attention Is All You Need." 31st Conference on Neural Information Processing Systems (NIPS 2017), Long Beach, CA, USA, 11 Pages.

Ozan Oktay et al., "Attention U-Net: Learning Where to Look for the Pancreas." arXiv:1804.03999v3 [cs.CV] May 20, 2018, 10 Pages.

Jonathan Ho et al., "Denoising Diffusion Probabilistic Models." 34th Conference on Neural Information Processing Systems (NeurIPS 2020), Vancouver, Canada, 12 Pages.

Prafulla Dhariwal et al., "Diffusion Models Beat GANs on Image Synthesis." 35th Conference on Neural Information Processing Systems (NeurIPS 2021), 15 Pages.

Alex Nichol et al., "Improved Denoising Diffusion Probabilistic Models." Proceedings of the 38 th International Conference on Machine Learning, PMLR 139, 2021, 10 Pages.

Jonathan Ho et al., "Classifier-Free Diffusion Guidance." arXiv:2207. 12598v1 [cs.LG] Jul. 26, 2022, 14 Pages.

Jiaming Song et al., "Denoising Diffusion Implicit Models." arXiv:2010. 02502v4 [cs.LG] Oct. 5, 2022, 22 Pages.

Konpat Preechakul et al., "Diffusion Autoencoders: Toward a Meaningful and Decodable Representation." CVPR 2022, pp. 10619-10629.

Diederik P. Kingma et al., "Adam: A Method for Stochastic Optimization." arXiv:1412.6980v9 [cs.LG] Jan. 30, 2017, 15 Pages.

Alexander Kirillov et al., "Segment Anything." Proceedings of the IEEE/CVF International Conference on Computer Vision 2023, pp. 4015-4026.

Olaf Ronneberger et al., "U-Net: Convolutional Networks for Biomedical Image Segmentation." N. Navab et al. (Eds.): MICCAI 2015, Part III, LNCS 9351, pp. 234-241, 2015.

Dani Valevski et al., "UniTune: Text-Driven Image Editing by Fine Tuning a Diffusion Model on a Single Image." arXiv:2210.09477v4 [cs.CV] Jul. 5, 2023, 16 Pages.

Jooyoung Choi et al., "Custom-Edit: Text-Guided Image Editing with Customized Diffusion Models." arXiv:2305.15779v1 [cs.CV] May 25, 2023, 11 Pages.

Ron Mokady et al., "Null-text Inversion for Editing Real Images using Guided Diffusion Models." CVPR 2023, pp. 6038-6047.

Chong Mou et al., "Dragondiffusion: Enabling Drag-Style Manipulation on Diffusion Models." arXiv:2307.02421v2 [cs.CV] Nov. 20, 2023, 18 Pages.

Hyungjin Chung et al., "Diffusion Posterior Sampling for General Noisy Inverse Problems." arXiv:2209.14687v4 [stat.ML] May 20, 2024, 30 Pages.

Zhenyu Yan et al., "AnomalySD: Few-Shot Multi-Class Anomaly Detection with Stable Diffusion Model," arXiv:2408.01960v1 [cs. CV] Aug. 4, 2024, 10 Pages.

Jiaqi Liu et al., "Deep Industrial Image Anomaly Detection: A Survey," arXiv:2301, 11514v3 [cs.CV May 30, 2023, 49 Pages.

Extended European search report for EP 25217279.6, dated May 4, 2026, 8 Pages.

* cited by examiner

INPUT IMAGE 10

SYNTHETIC IMAGE 30

FIRST SOURCE IMAGE 40

SECOND SOURCE IMAGE 50

DDIM INVERSION

DDIM GENERATION PROCESS

FIRST SOURCE IMAGE 40

FIRST SEGMENTATION MASK 42

SECOND SOURCE IMAGE 50

SECOND SEGMENTATION MASK 52

TARGET MASK 60

COMPLEMENT MASK 70
OVERLAYED ON INPUT IMAGE 10

DIFFUSION-BASED IMAGE SYNTHESIS WITH DEFECT BLENDING VIA FEATURE-LEVEL OPTIMIZATION

TECHNICAL FIELD

This disclosure relates generally to computer vision and anomaly detection, and more particularly to digital image synthesis via a diffusion-based machine learning model with feature-level supervision and per-step optimization.

BACKGROUND

Synthesizing novel defects of manufacturing parts helps to build intelligent and robust machine learning models to detect defects when deployed on-line onto production assembly lines. Pretrained Diffusion models have been shown to synthesize realistic images. However, directly using them to synthesize various defects of specialized manufacturing parts poses challenges due to the specificity and complexity of such items, as well as some proprietary concerns.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method relates to image synthesis. The method includes receiving an input image that displays an object. The method includes receiving (i) a first source image that displays a first defect and (ii) a corresponding first segmentation mask that includes a first predetermined value assigned to each pixel of a first image segment of the first defect and a second predetermined value assigned to remaining pixels of the first segmentation mask. The method includes receiving (i) a second source image that displays a second defect and (ii) a corresponding second segmentation mask that includes the first predetermined value assigned to each pixel of a second image segment of the second defect and the second predetermined value assigned to remaining pixels of the second segmentation mask. The method includes generating, via a machine learning model, a first source feature map based on a latent representation of the first source image at each step of a forward diffusion process. The method includes generating, via the machine learning model, a second source feature map based on a latent representation of the second source image at each step of the forward diffusion process. The method includes generating a target feature map by combining (i) a first masked feature map that is the first source feature map overlayed with the first segmentation mask and (ii) a second masked feature map that is the second source feature map overlayed with second the segmentation mask. The method includes generating, via the forward diffusion process involving the machine learning model, a noisy latent representation of the input image. The method includes generating, via a reverse diffusion process involving the machine learning model, a new latent representation by denoising the noisy latent representation in a plurality of steps, the plurality of steps including a current step that (i) minimizes an energy function to generate an optimized iterate of a current version of denoising the noisy latent representation, the energy function including at least a first energy component that compares differences between (a) a masked current feature map, the masked current feature map being the current feature map overlayed with the segmentation mask, the current feature map generated by the machine learning model based on the current version and (b) the target feature map of the current step, (ii) predicting, via the machine learning model, a current amount of noise in the optimized iterate, and (iii) generating a next version using the current amount of noise and the optimized iterate. The method includes decoding the new latent representation to generate a synthetic image. The synthetic image displays the object with a new defect. The new defect includes a combination of a rendition of the first defect and a rendition of the second defect.

According to at least one aspect, a computer-implemented method relates to image synthesis. The method includes receiving an input image that displays an object. The method includes receiving (i) a first source image that displays a first defect and (ii) a corresponding first segmentation mask that includes a first predetermined value assigned to each pixel of a first image segment of the first defect and a second predetermined value assigned to remaining pixels of the first segmentation mask. The method includes receiving (i) a second source image that displays a second defect and (ii) a corresponding second segmentation mask that includes the first predetermined value assigned to each pixel of a second image segment of the second defect and the second predetermined value assigned to remaining pixels of the second segmentation mask. The method includes generating, via a machine learning model, a first source feature map based on the first source image at each step of a forward diffusion process. The method includes generating, via the machine learning model, a second source feature map based on the second source image at each step of the forward diffusion process. The method includes generating a target feature map by combining (i) a first masked feature map that is the first source feature map overlayed with the first segmentation mask and (ii) a second masked feature map that is the second source feature overlayed with second the segmentation mask. The method includes generating, via the forward diffusion process involving the machine learning model, a noisy input image. The method includes generating, via a reverse diffusion process involving the machine learning model, a synthetic image by denoising the noisy input image in a plurality of steps. The plurality of steps including a current step that (i) minimizes an energy function to generate an optimized iterate of a current version of denoising the noisy input image, the energy function including at least a first energy component that compares differences between (a) a masked current feature map, the masked current feature map being the current feature map overlayed with the segmentation mask, the current feature map generated by the machine learning model based on the current version and (b) the target feature map of the current step, (ii) predicts, via the machine learning model, a current amount of noise in the optimized iterate, and (iii) generates a next version using the current amount of noise and the optimized iterate. The synthetic image displays the object with a new defect. The new defect includes a combination of a rendition of the first defect and a rendition of the second defect.

According to at least one aspect, a computer-implemented method of generating a dataset includes receiving an input image that displays an object. The method includes receiving (i) a first source image that displays a first defect and (ii) a corresponding first segmentation mask that includes a first predetermined value assigned to each pixel of a first image segment of the first defect and a second predetermined value assigned to remaining pixels of the first segmentation mask. The method includes receiving (i) a second source image that displays a second defect and (ii) a corresponding second segmentation mask that includes the first predetermined value assigned to each pixel of a second image segment of the second defect and the second predetermined value assigned to remaining pixels of the second segmentation mask. The method includes generating, via a machine learning model, a first source feature map based on a latent representation of the first source image at each step of a forward diffusion process. The method includes generating, via the machine learning model, a second source feature map based on a latent representation of the second source image at each step of the forward diffusion process. The method includes generating a target feature map by combining (i) a first masked feature map that is the first source feature map overlayed with the first segmentation mask and (ii) a second masked feature map that is the second source feature map overlayed with second the segmentation mask. The method includes generating, via the forward diffusion process involving the machine learning model, a noisy latent representation of the input image. The method includes generating, via a reverse diffusion process involving the machine learning model, a new latent representation by denoising the noisy latent representation in a plurality of steps, the plurality of steps including a current step that (i) minimizes an energy function to generate an optimized iterate of a current version of denoising the noisy latent representation, the energy function including at least a first energy component that compares differences between (a) a masked current feature map, the masked current feature map being the current feature map overlayed with the segmentation mask, the current feature map generated by the machine learning model based on the current version and (b) the target feature map of the current step, (ii) predicts, via the machine learning model, a current amount of noise in the optimized iterate, and (iii) generates a next version using the current amount of noise and the optimized iterate. The method includes decoding the new latent representation to generate a synthetic image. The synthetic image displays the object with a new defect. The new defect includes a combination of a rendition of the first defect and a rendition of the second defect. The dataset includes the synthetic image. The dataset is configured for training an image classifier.

According to at least one aspect, a computer-implemented method of generating a dataset includes receiving an input image that displays an object. The method includes receiving (i) a first source image that displays a first defect and (ii) a corresponding first segmentation mask that includes a first predetermined value assigned to each pixel of a first image segment of the first defect and a second predetermined value assigned to remaining pixels of the first segmentation mask. The method includes receiving (i) a second source image that displays a second defect and (ii) a corresponding second segmentation mask that includes the first predetermined value assigned to each pixel of a second image segment of the second defect and the second predetermined value assigned to remaining pixels of the second segmentation mask. The method includes generating, via a machine learning model, a first source feature map based on the first source image at each step of a forward diffusion process. The method includes generating, via the machine learning model, a second source feature map based on the second source image at each step of the forward diffusion process. The method includes generating a target feature map by combining (i) a first masked feature map that is the first source feature map overlayed with the first segmentation mask and (ii) a second masked feature map that is the second source feature overlayed with second the segmentation mask. The method includes generating, via the forward diffusion process involving the machine learning model, a noisy input image. The method includes generating, via a reverse diffusion process involving the machine learning model, a synthetic image by denoising the noisy input image in a plurality of steps. The plurality of steps including a current step that (i) minimizes an energy function to generate an optimized iterate of a current version of denoising the noisy input image, the energy function including at least a first energy component that compares differences between (a) a masked current feature map, the masked current feature map being the current feature map overlayed with the segmentation mask, the current feature map generated by the machine learning model based on the current version and (b) the target feature map of the current step, (ii) predicts, via the machine learning model, a current amount of noise in the optimized iterate, and (iii) generates a next version using the current amount of noise and the optimized iterate. The synthetic image displays the object with a new defect. The new defect includes a combination of a rendition of the first defect and a rendition of the second defect. The dataset includes the synthetic image. The dataset is configured for training an image classifier.

These and other features, aspects, and advantages of the present invention are discussed in the following detailed description in accordance with the accompanying drawings throughout which like characters represent similar or like parts. Furthermore, the drawings are not necessarily to scale, as some features could be exaggerated or minimized to show details of particular components.

DETAILED DESCRIPTION

Figure 1:
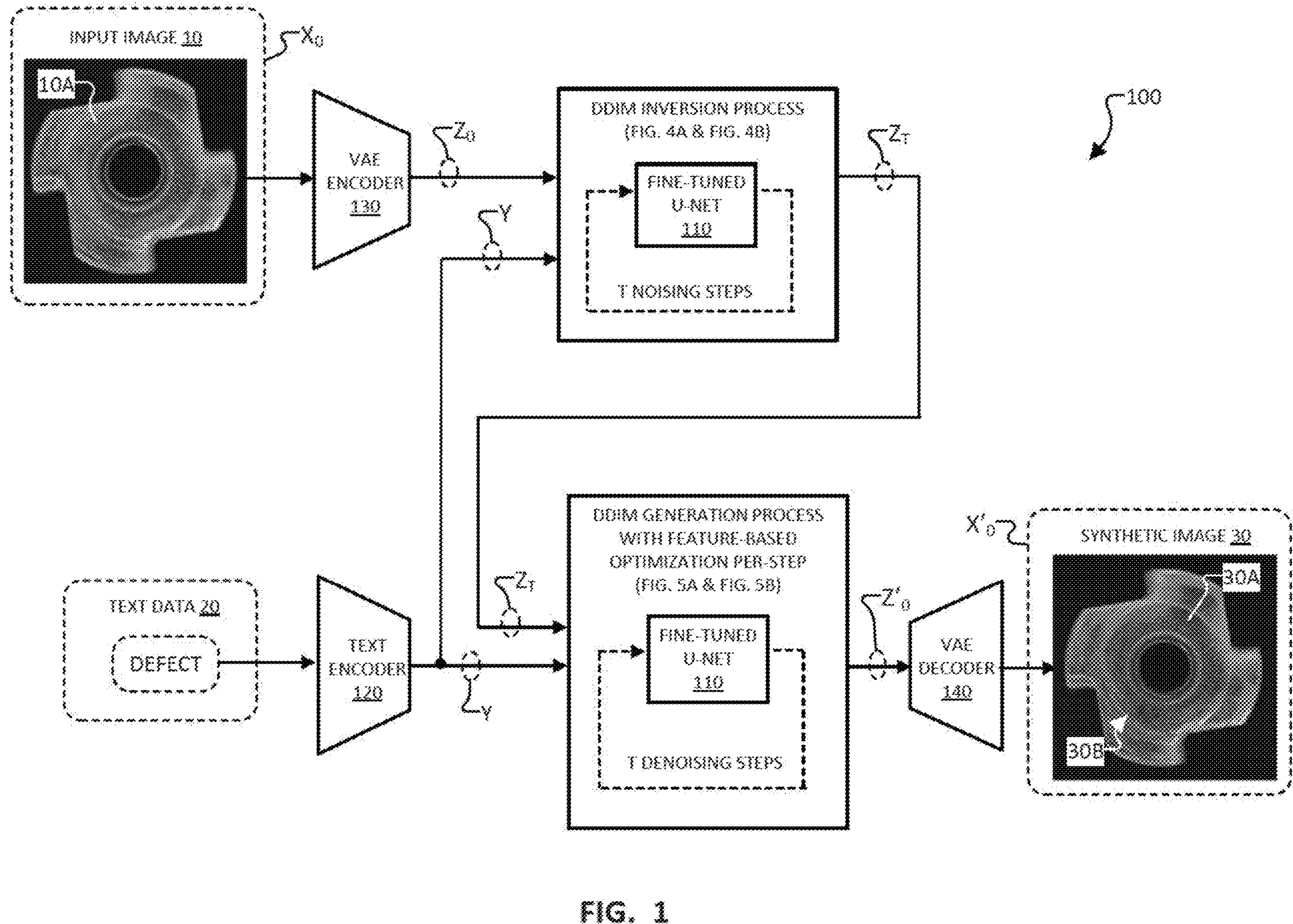
FIG. 1 is a flow diagram that provides an overview of an example of an image synthesis process via a machine learning model according to at least one example embodiment of this disclosure.

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Recent advances in deep learning have opened new possibilities for image synthesis and image editing. However, there has been little exploration into applying these technologies for the synthesis of specific defects at specified locations of digital images relating to some fields (e.g., manufacturing field, medical field, etc.), where the information is not publicly shared and/or available. In particular, the challenge remains in accurately capturing defect patterns from one image and transferring them onto defect-free objects in digital images while maintaining realism and precision in the new image.

As an example, in the field of manufacturing, ensuring the quality of produced parts is crucial to maintaining operational efficiency and product reliability. Defects in manufactured parts can lead to significant losses, both in terms of material wastage and time spent in manual inspection and correction. This also has serious implications for the safe usage of the manufactured goods and the reputation of the company. Traditional methods of identifying and simulating defects in manufacturing processes often rely on either manual inspection or machine vision systems that are limited by their ability to synthesize or transfer specific defect characteristics from one part to another. These limitations make it challenging to fully test the robustness of manufacturing systems and processes against a wide variety of defect types.

This disclosure provides a technical solution for synthesizing novel defects in digital images to build intelligent and robust machine learning models to distinguish between defect and non-defect samples. For example, this disclosure includes embodiments that enable machine learning models to synthesize specific defects (e.g., scratches, discolorations, dents, protrusions, etc.) for a given application (e.g., manufacturing, medical imaging, etc.) with a high degree of control while eliminating the need for very complex and technical text inputs from an expert. The embodiments provide an effective and efficient way to synthesize novel defects in digital images with a high degree of controllability. Moreover, this image synthesis approach generates realistic synthetic images, thereby reducing the data imbalance that may found in some fields, (e.g., manufacturing field, medical field, etc.), where there are limited image samples due to, for example, particular privacy and confidentiality concerns. Specifically, the embodiments provide a novel approach to image synthesis via feature-level energy optimization using diffusion-based machine learning models (e.g., Text-to-Image Diffusion Model, Text-to-Image Latent Diffusion Model, etc.).

FIG. 1 is a flow diagram, which provides an overview of an image synthesis process along with a non-limiting examples of input data and output data. As shown in FIG. 1, at this instance, the image synthesis process generates a synthetic image 30 with a synthesized defect, which is a new defect 30B and which is a combination of a rendition of a first defect 40C (FIG. 2C) and a second defect 50C (FIG. 2D). The image synthesis process generates the synthetic image 30 upon receiving at least an input image 10 and text data 20. The synthetic image 30 is generated via a finetuned machine learning model based on the input image 10 and the text data 20. In FIG. 1, the finetuned machine learning model is a finetuned Text-to-Image Latent Diffusion Model 100 that operates in the latent space. In other examples, the finetuned machine learning is a finetuned Text-to Image Diffusion Model (i.e., the finetuned U-Net 110 and the text encoder 120) that operates in the image space. The synthetic image 30 displays at least one new defect, which is not displayed in the input image 10. For example, as shown in FIG. 1, the input image 10 does not contain the first defect rendition 30B, the second defect rendition 30C, or a combination thereof.

Referring to FIG. 1, the image synthesis process uses a finetuned Text-to-Image Latent Diffusion Model 100, which comprises (i) a variational autoencoder (VAE) including a VAE encoder 130 and a VAE decoder 140, (ii) a text encoder 120, and (iii) a latent diffusion model, such as finetuned U-Net 110. The image synthesis process includes at least a Denoising Diffusion Implicit Model (DDIM) inversion process (FIGS. 4A and 4B) and a DDIM generation process (FIG. 5A and FIG. 5B). The DDIM inversion process includes a number (denoted as T) of noising steps using the finetuned U-Net 110. In addition, the DDIM generation process includes a same number (T) of denoising steps using the finetuned U-Net 110.

Figure 2A:
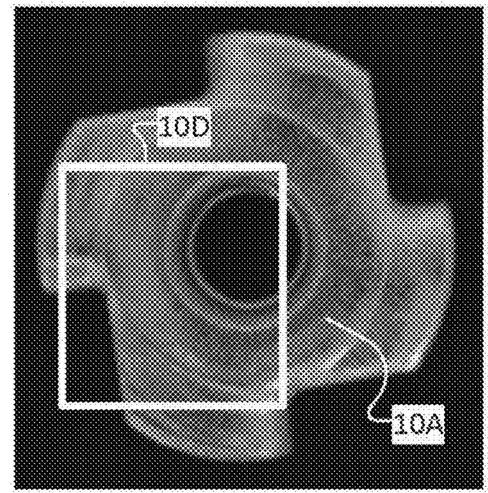
FIG. 2A and FIG. 2B illustrate enlarged views of the non-limiting examples of the digital images of FIG. 1 according to at least one example embodiment of this disclosure.

As shown in FIG. 1, the image synthesis process generates a synthetic image 30, which resembles the input image 10 with a new defect 30B at a specified location (e.g. bounding box 10D of FIG. 2A). More specifically, the VAE encoder 130 receives the input image 10 as input. The VAE encoder 130 generates a latent representation of the input image 10 as output using the input image 10. In addition, the text encoder 120 generates text embedding, y, of the text data 20 (e.g., a textual description such as "defect"). In this non-limiting example, the text data 20 relates to or is indicative of a defect. Next, a DDIM inversion process is performed based on the latent representation of the input image 10 and the text embedding. The DDIM inversion process includes a number, T, of noising steps to generate a noisy image (e.g., Gaussian noise image) based on the input image 10 and the text embedding. The DDIM inversion process uses the finetuned U-Net 110 at each step to predict an amount of noise that is present in a latent representation of a current version of the noising of the input image 10 at timestep t. After completing T noising steps (in a forward direction from t=1 to t=T), the DDIM inversion process generates a latent representation, $z_T$.

The DDIM generation process receives the latent representation, $z_T$, as well as the same text embedding, y, of the same text data 20 (e.g., the textual description such as "defect") as the DDIM inversion process. The DDIM generation process includes a number (denoted as T) of denoising steps to generate a synthetic image 30 (e.g., new image that displays a reconstruction of the object 10A along with the generation of a new defect 10B at the specified location) based on the latent representation, $z_T$, and the text embedding. The DDIM generation process uses the finetuned U-Net 110 at each step to predict an amount of noise that is present in a latent representation of a current version of the denoising at timestep t. After performing T denoising steps in a reverse direction from t=T to t=1, the DDIM generation process generates a latent representation, $\acute{z}_0$, of the synthetic image $\acute{x}_0$. The VAE decoder 140 generates the synthetic image $\acute{x}_0$ by decoding this latent representation, $\acute{z}_0$. As shown in FIG. 1, the synthetic image 30 is not a mere reconstruction of the input image 10. Rather, the synthetic image 30 displays the input image 10 with a new defect 30B at the desired location of the input image 10. Specifically, as shown in FIG. 1, the synthetic image 30 displays an object 30A (corresponding to object 10A of the input image 10) and the new defect 30B.

Figure 2B:
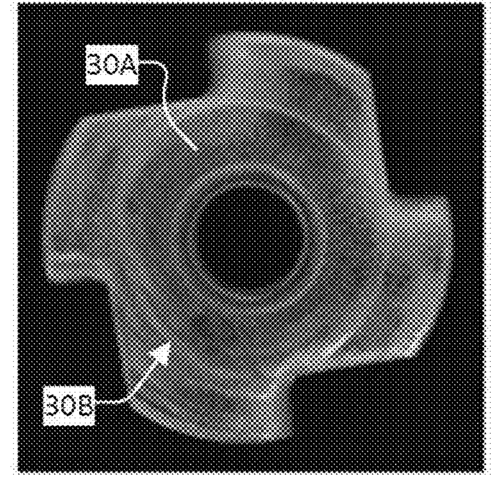

FIG. 2A and FIG. 2B illustrate enlarged views of the non-limiting examples of the digital images (e.g., input image 10 and synthetic image 30) of FIG. 1. In particular, FIG. 2A illustrates an input image 10, which is the input to the machine learning model (e.g., the finetuned Text-to-Image Latent Diffusion Model 100) and which displays an object 10A. As shown in FIG. 2A, the object 10A is deemed normal or non-anomalous. That is, the object 10A does not include any visible, physical defects above a certain threshold for detection/inspection. In this example, the object 10A is a metal nut. Also, the input image 10 displays a bounding box 10D, which indicates a desired or specified location (or a target region) for generating a new defect. The desired or specified location may be provided with respect to any part of the object 10A and/or any suitable part of the input image 10. In this non-limiting case, the bounding box 10D is located at a lower left portion of the object 10A (or a lower portion of the input image 10).

In addition, FIG. 2B illustrates a digital image, which is the output that is generated, via the machine learning model (e.g., the finetuned Text-To-Image Latent Diffusion Model 100), based on the input image 10. Specifically, the Text-To-Image Latent Diffusion Model 100 generates a synthetic image 30 as the output. As shown in FIG. 2B, the synthetic image 30 displays a reconstruction of the object 10A together with the generation of the new defect 30B. That is, the synthetic image 30 displays the object 30A (corresponding to object 10A of the input image 10) and the new defect 30B. The new defect 30B is displayed with the desired transformation at the desired location, as specified by the bounding box 10D. The desired location may be specified in advance by the user. For instance, in this case, the new defect 30B is generated within the specified region, which corresponds to the bounding box 10D of the input image 10. Also, in FIG. 2B, the new defect 30B is generated with the desired transformation (e.g. displacement or rotation), which may be specified by the user in advance. The specified transformation includes a set of transformations. The set of transformations may include one or more affine transformations (e.g., displacement, rotation, resizing, flipping, shearing, etc.). In the examples shown in FIG. 2A and FIG. 2B, the finetuned Text-To-Image Latent Diffusion Model 100 is advantageous in being configured to generate the synthetic image 30, which includes at least one new defect 30B that has realistic appearance for being based on a combination of actual, real defects taken from source images. Upon being generated, these synthetic images 30 may be used as anomalous data samples for training another machine learning model, such as an image classifier (e.g., classifier 1014 of FIG. 10) or an anomaly detector, to detect anomalies and/or defects in digital images within a technical system, such as Automated Optical Inspection (AOI) system, a medical imaging system, etc.

Figure 2C:
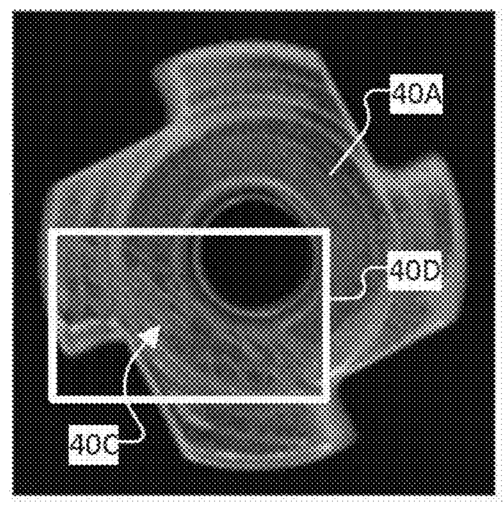
FIG. 2C and FIG. 2D illustrate non-limiting examples of source images that are used during the image synthesis process of FIG. 1 according to at least one example embodiment of this disclosure.
Figure 2D:
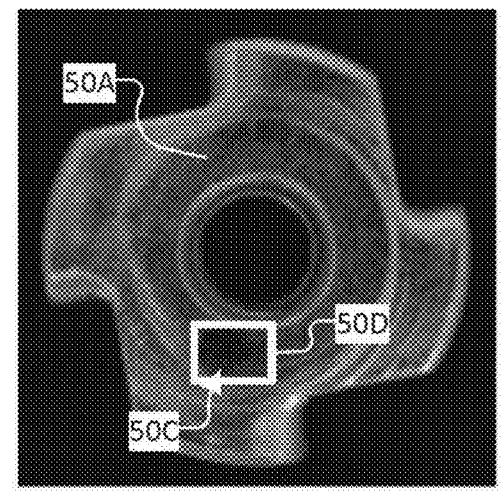

FIG. 2C and FIG. 2D illustrate non-limiting examples of source images that are used during the image synthesis process of FIG. 1. Specifically, FIG. 2C illustrates a first source image 40 that displays an object 40A (e.g., metal nut) with a defect 40C (e.g., scratch). The defect 40C may be referred to as the "first defect" for being associated with the first source image 40. In addition, for convenience in viewing the first defect 40C, the first source image 40 includes a bounding box 40D to illustrate the region that is mostly occupied by the first defect 40C. In addition, FIG. 2D illustrates a second source image 50 that displays an object 50A (e.g., metal nut) with a defect 50C (e.g., a discolored region). The defect 50C may be referred to as the "second defect" for being associated with the second source image 50. In addition, for convenience in viewing this second defect 50C, the second source image 50 includes a bounding box 50D to illustrate the region that is mostly occupied by the second defect 50C. As shown in FIG. 2C and FIG. 2*d*, the first defect 40C (e.g., scratch) is a different type of defect than the second defect 50C (e.g., discolored region). In addition, a size of the first defect 40C is larger in size than the second defect 50C, as clearly indicated, for example, by the size difference of bounding box 40D compared to bounding box 50*d*. Furthermore, the image synthesis process generates a new defect 30B, which is a blended defect or a combined defect. The new defect 30B is generated based on a first amount of the first defect 40C (e.g., scratch) and a second amount of the second defect 50C (e.g., discolored region) with any desired transformations at the desired region (e.g., bounding box 10D), which is specified with respect the input image 10.

Referring back to FIG. 1, as aforementioned, the Text-To-Image Latent Diffusion Model may include three main components that are configured to interact with one another. The first component is a text encoder 120, which receives text-based data sample as an input, and, when executed, proceeds to convert the text-based data sample into an embedding, as indicated by text embedding 316. For example, the text encoder 120 is an encoder of a large language model (LLM), a text encoder of Contrastive Language-Image Pre-training (CLIP), or any applicable text encoding technology. The second component is the VAE, in which the VAE encoder 130 receives image-based data sample 302 and generates a latent space representation 308, $z_0$, of the image, and the VAE decoder 140 receives a latent space representation, $\acute{z}_0$, and generates the synthetic image 30, $\acute{x}_0$. The third component is a convolutional neural network 318 (e.g., U-Net 110), which receives a noisy latent space representation 312 from noise model 310, along with text embedding 316, and predicts an amount of noise of the noisy latent space representation.

Also, the Text-To-Image Latent Diffusion Model 100 falls within the latent diffusion model class, as convolutional neural network 318 is configured to work within a latent space. In other embodiments, however, a Text-To-Image Diffusion Model may be used such that entirety of the process of FIG. 1 remains within the image space. In such embodiments, the input image 10 is provided directly to noise model 310 without passing through the VAE encoder 130, and a noisy version of the input image 10 is then provided to convolutional neural network 318. Similarly, the output of convolutional neural network 318 is then used to directly generate the synthetic image 30 after the DDIM Generation Process, rather than passing through the VAE decoder.

Figure 3:
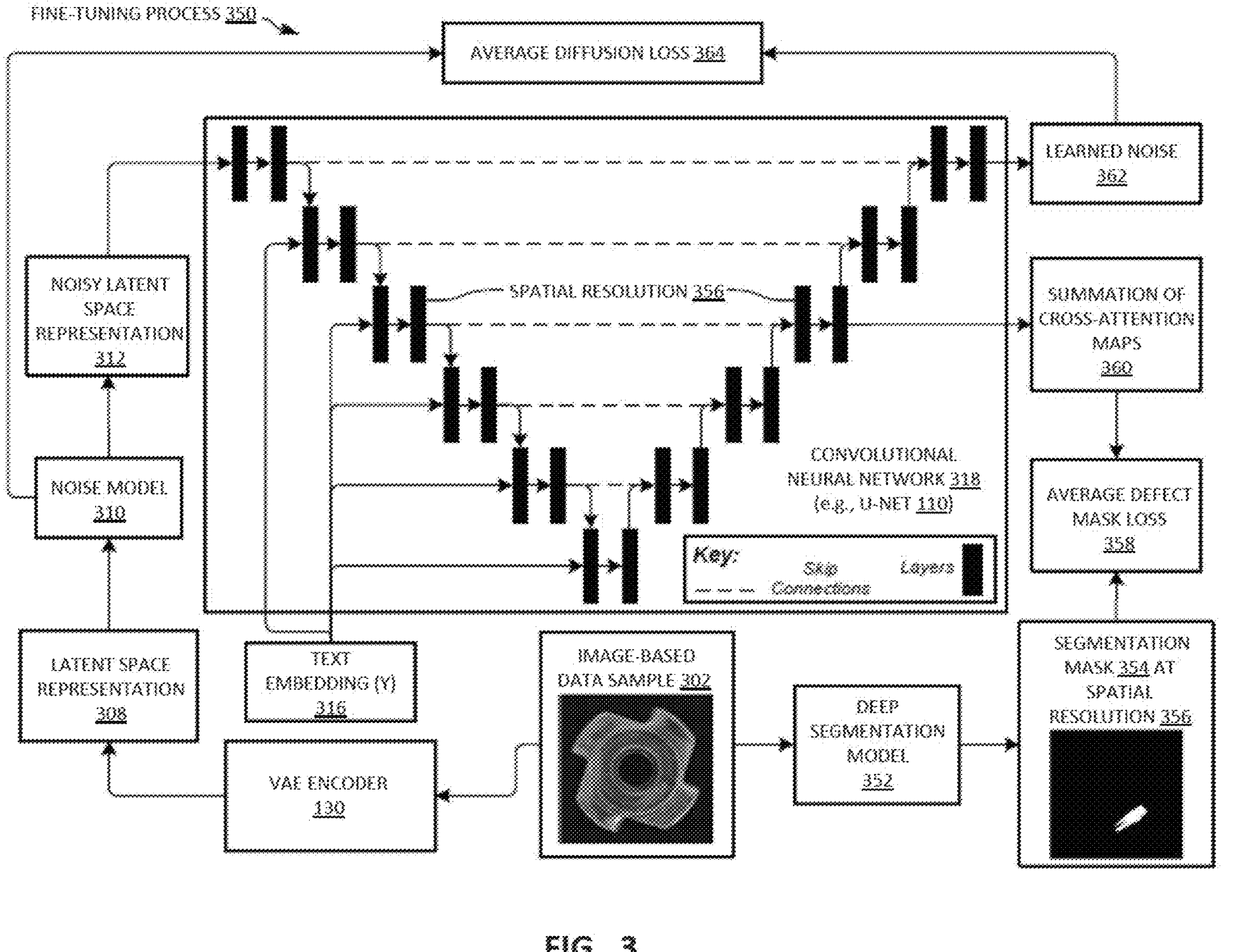
FIG. 3 illustrates an example of a process for finetuning the U-Net of FIG. 1 according to at least one embodiment of this disclosure.
Figure 6:
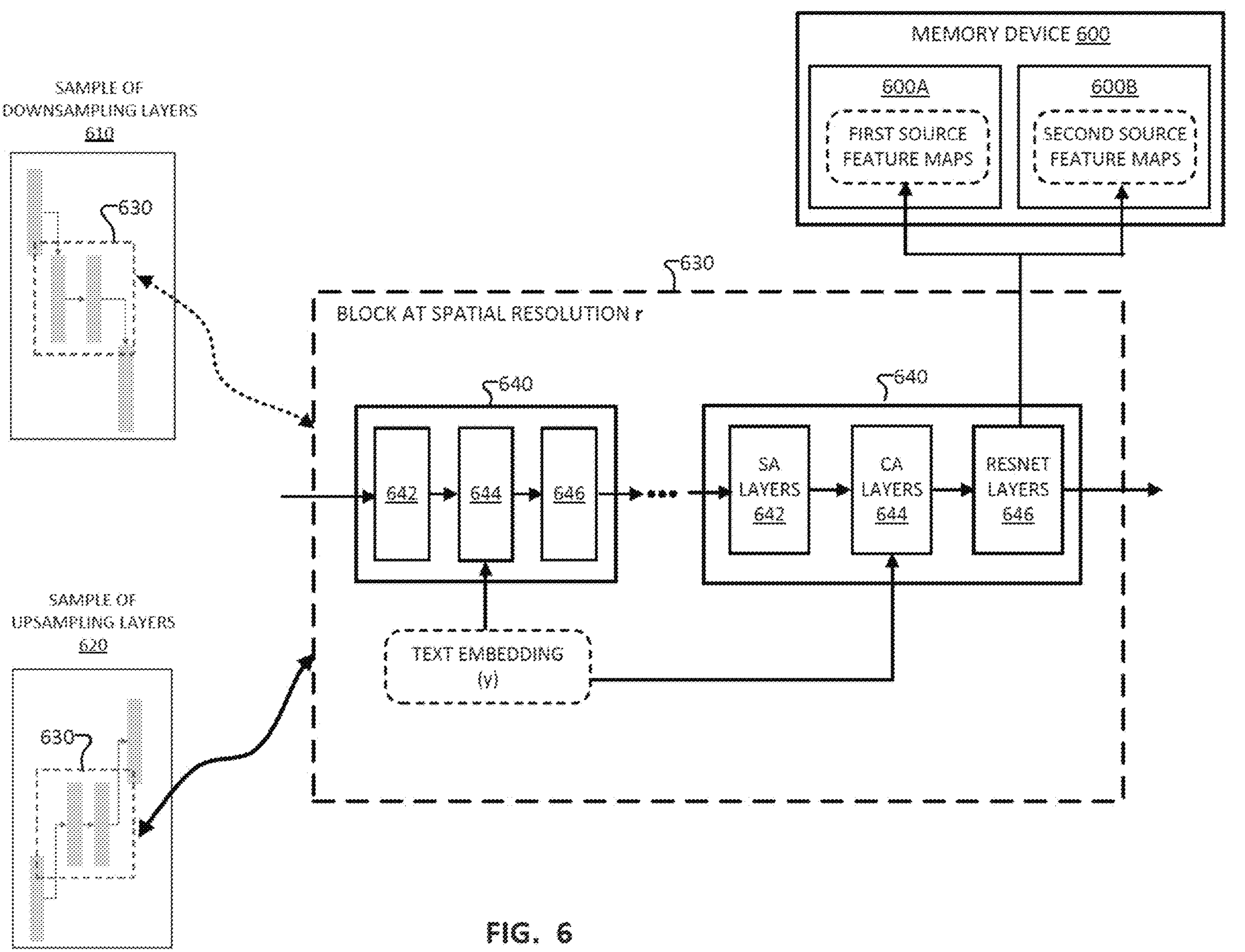
FIG. 6 illustrates aspects of an example of the intermediate layers of the U-Net of FIG. 1 according to at least one example embodiment of this disclosure.

Moreover, a Text-To-Image Latent Diffusion Model, such as those described herein within the context of defect detection, may include at least a LLM text encoder, a variational autoencoder, and a convolutional neural network. The convolutional neural network may be configured to have a U-Net architecture. As such, and as related to the description herein, a "convolutional" neural network that is configured to have a U-Net architecture may be defined as having convolutional neural network layers, self-attention layers, cross-attention layers, and Residual Neural Network (ResNet) layers that are layered on top of one another and in between an input layer and an output layer of the model. These layers are shown in FIG. 3 and FIG. 6. Additional embodiments pertaining to such types of machine learning models are described herein with regard to Text-to-Image Latent Diffusion Model 100 and convolutional neural network 318.

Embodiments illustrated in the following FIG. 3 continue to describe convolutional neural network 318 as being implemented with the Text-To-Image Latent Diffusion Model 100. However, it should be understood that a similar fine-tuning process of convolutional neural network 318 may be performed for embodiments in which convolutional neural network 318 is implemented such that the Text-To-Image Diffusion Model remains in the image space, rather than converting into the latent space.

FIG. 3 illustrates a process for fine-tuning a convolutional neural network (e.g., the U-Net architecture of the Stable Diffusion model) within the Text-To-Image Latent Diffusion Model 100 introduced in FIG. 1, according to some embodiments. At a moment in time depicted by FIG. 3, it should be understood that convolutional neural network 318 refers to a pre-trained model that is now undergoing fine-tuning via the methods described herein. The model is referred to as a "pre-trained" model because the model has already undergone one or more rounds of training using various training datasets, and thus is at a point at which it may be used for generalized tasks. The moment in time depicted in FIG. 3 thus refers to "fine-tuning" the pre-trained convolutional neural network 318 of Text-To-Image Latent Diffusion Model 100 in order to enable the learning of detecting defects within images of manufactured products. The "pre-trained" Text-To-Image Latent Diffusion Model has yet to be trained for such a specialized task, and therefore the architecture shown in FIG. 3 and the corresponding processes described herein pertain to fine-tuning the model such that it may then be executed for such types of specialized tasks (e.g., detecting a portion of an image that contains a defect, scratch, mark, or other quality issue).

The following paragraphs describe the four process flows that collectively define fine-tuning process 350 and that are configured to operate using the U-Net architecture shown in FIG. 3. The paragraphs are formatted in a way as to discuss sequential steps that are taken in order to execute a pre-trained, convolutional neural network 318 of Text-To-Image Latent Diffusion Model 100 for fine-tuning such that the model learns to detect portion(s) of an image that refer to a defect of a manufactured product. The first process flow refers to blocks 302, 120, 308, 310, 312, 20, 140, and 316 of FIG. 3. The second process flow refers to blocks 318, 316, 312, and 362 of FIG. 3. The third process flow refers to blocks 310, 362, and 364 of FIG. 3. The fourth process flow refers to blocks 302, 352, 356, 358, and 360 of FIG. 3.

Referring now to the first process flow, inputs to the convolutional neural network 318 of Text-To-Image Latent Diffusion Model 100 include both a noisy latent space representation 312 and embedded text 316. As introduced in FIG. 1, image-based data sample 302 is provided to VAE encoder 130 in order to compress the image into latent space representation 308. Latent space representation 308 is then provided to noise model 310 to output a noisy latent space representation 312, prior to providing said sample to the convolutional neural network 318. As also introduced in FIG. 1, text-based data sample is provided to an LLM text encoder 120, such as the CLIP encoder, to output embedded text 316.

As shown in FIG. 3, image-based data sample 302 resembles a manufactured product (e.g., a nut) with a defect (e.g., a scratch) on the surface of the bottom right-hand side of the image. As the present disclosure pertains to detecting defects within a manufacturing setting, the image-based data sample may resemble an image of a product that was captured while the product was still within a manufacturing facility and that has completed the manufacturing process, but has not yet left the production facility (e.g., to be sold or transported elsewhere). In some embodiments, the captured image may correspond to a moment in time at which a quality check of manufactured products is being made in an assembly line setting.

The particular image-based data sample shown in FIG. 3 is a manufactured product that resembles a nut. However, it should be understood that images of other manufactured products are also meant to be encompassed in the discussion herein. In some embodiments, the image may resemble a bolt or a screw, or some other mechanical product component. In such embodiments, the image may include a scratch, dent, defect, or other physical quality issue with a portion of the overall manufactured product. In other embodiments, the image may resemble a portion of a larger manufactured product. For example, the image may capture a hood of a car that is being manufactured within a car manufacturing facility, and the image may further include a portion of the hood of the car that has a dent or scratch.

The text-based data sample, as also shown in FIG. 1, includes some short word, phrase, or sentence that provides a description for image-based data sample 302. For example, the text-based data sample that corresponds to image-based data sample 302 could contain the word "defect," the phrase "nut with scratch," or a sentence "The image is manufactured product X with a mark on the right." It should be understood that any other short word or phrase that provides initial information to the convolutional neural network 318, indicating that image-based data sample 302 contains a manufacturing defect, could equally be used as text-based data sample, including words and phrases such as "scratch," "dent," "defect," "discoloration," "warping," "bent," "quality check failure," etc.

Returning now to the four process flows that collectively define fine-tuning process 350, the first process flow is illustrated using blocks 302, 120, 308, 310, and 312, and refers to a preparation of a noisy latent space representation 312 that is then used as an input to the convolutional neural network 318. In order to fine-tune convolutional neural network 318 to learn to detect defects within image-based data samples, initial latent space representation 308 is provided to a noise model 310, which, when executed, adds stochastic noise to the latent space representation of image-based data sample 302 to output noisy latent space representation 312. In some embodiments, the noise model is configured to have a predetermined noise schedule that depends on the time step t that gradually lowers the signal-to-noise ratio of the original image-based data sample 302. As additionally described below, the added noise is then used during the execution of the convolutional neural network 318 in order to learn to predict the noise (see also learned noise 362, additionally described below).

The second process flow of the four process flows refers to blocks 318, 316, 312, and 362 of FIG. 3, and refers more specifically to an execution of the convolutional neural network 318. In some embodiments, the noisy latent space representation 312 and the embedded text 316 are provided to convolutional neural network 318, as indicated by the arrows in FIG. 3, and then the model is then executed to predict noise within noisy latent space representation 312 using a plurality of cross-attention maps at different spatial resolutions within the U-Net architecture of convolutional neural network 318. Cross-attention maps may be defined herein as the output or activation of a cross-attention block within the U-Net architecture of the convolutional neural network of the Text-To-Image Latent Diffusion Model 100.

In some embodiments, the execution of the Text-to-Image Latent Diffusion Model 100 (or the Text-to-Image Diffusion Model) includes a forward process and a reverse process. During the forward process, Gaussian noise is gradually added to the noisy latent space representation to destroy any structure in the image-based data sample and eventually convert the information within the original image-based data sample into Gaussian noise. During the reverse process, the convolutional neural network is trained to gradually remove the noise that has been added to the image-based data sample in the forward process, as indicated via learned noise 362 in FIG. 3. With respect to both the forward and the reverse processes, "gradually" refers to the processes as being auto-regressive and including a large number of steps and/or iterations. Once a given training and/or fine-tuning execution of convolutional neural network 318 is complete, the model is thus able to generate image-based data samples, such as synthetic image 30, using the reverse diffusion process.

In some embodiments, Text-To-Image Latent Diffusion Model 100 leverages an LLM text encoder 120 that has been trained on vast amounts of publicly available internet text data in order to "guide" the generation process of the convolutional neural network 318 of Text-To-Image Latent Diffusion Model 100. The "guidance" of the model may in part be configured by modifying the reverse process of the model, in which the reverse process is perturbed at each step by small amounts to influence the overall evolution and thus output of the reverse process. The modification may be computed using conditional guidance, classifier guidance, or classifier-free guidance. For example, a Text-To-Image Latent Diffusion Model 100 may be configured such that conditional guidance is used, and thus the reverse, or generation, process is "conditioned" on the text-based data sample, such as text data 20 (e.g., the word "defect").

Furthermore, and again by leveraging Large Language Models, a pre-trained Large Language Model is executed to convert the text-based data sample into a list of tokens, which are then further processed into embedding vectors as one vector for each token. The embedding vectors are then incorporated into the diffusion generation process using cross-attention blocks, as shown in FIG. 3. The cross-attention blocks use an attention mechanism to ensure that the different portions of the noisy latent space representation 312 are correctly influenced by the most relevant parts of the embedded text 316. In some embodiments, the U-Net architecture may be used to configure this connection between the cross-attention blocks and the respective inputs to Text-To-Image Latent Diffusion Model 100.

Moreover, the U-Net architecture may additionally be mathematically represented by (i)

$$\epsilon_t^\theta = DM(t, x_t, y),$$

where DM refers to Text-to-Image Diffusion Model, or (ii)

$$\epsilon_t^\theta = LDM(t, z_t, y),$$

where LDM refers to Text-to-Image Latent Diffusion Model, and in both cases, y, is the text embedding fed to the U-Net 110 and θ are the trainable weights of the U-Net 110. The U-Net 110 is used at every step t of the reverse process to predict the amount of noise present in the current iterate of the generation process, e.g., wherein $$\epsilon_t^\theta$$

is the predicted amount of noise in $x_t$ or $z_t$ at step t. The conditional text guidance may therefore be written as y, wherein y is the same for respective steps t of the generation process. The reverse process may include a number of steps t corresponding to a number within a range of 1000-4000 in order to generate high quality data, according to some embodiments. In order to prevent the reverse, or generation, process from becoming computationally expensive or slow, the following modifications may be further made to the architecture of convolutional neural network 318 of Text-To-Image Latent Diffusion Model 100.

In some embodiments, "samplers" may be applied for diffusion models, wherein such a configuration causes the reverse process to become faster while not significantly compromising the quality of generated data. For example, a Denoising Diffusion Implicit Model (DDIM) sampler modifies the forward process such that it is non-Markovian, thus enabling for a modified reverse process with significantly few steps. In some embodiments, the DDIM generation sampler is computed via equation 1, wherein 0 collectively represents the weights of the entire Text-to-Image Diffusion Model, which includes the U-Net 110 and the VAE encoder 130. In other embodiments involving the Text-to-Image Latent Diffusion Model 100, the DDIM sampler may be written as equation 2.

$$x_{t-1} = \sqrt{\alpha_{t-1}}\left(\frac{x_t - \sqrt{1-\alpha_t}\,\epsilon_t^{\theta}(t, x_t, y)}{\sqrt{\alpha_t}}\right) + \sqrt{1-\alpha_{t-1}}\,\epsilon_t^{\theta}(t, x_t, y) \quad [1]$$

$$z_{t-1} = \sqrt{\alpha_{t-1}}\left(\frac{z_t - \sqrt{1-\alpha_t}\,\epsilon_t^{\theta}(t, z_t, y)}{\sqrt{\alpha_t}}\right) + \sqrt{1-\alpha_{t-1}}\,\epsilon_t^{\theta}(t, z_t, y) \quad [2]$$

Since the DDIM sampler is deterministic and does not involve addition of noise at each step t, one can use DDIM to encode data into a DDIM latent code or DDIM latent noise vector. Here DDIM-latent-code is used to explicitly distinguish from VAE latent code. Specifically, the DDIM-latent-code can then be used as a starting point of a reverse, or generation, process to generate (i) a reconstruction of the original input image, when there is no feature-level energy optimization phase 510, or (ii) a synthetic image when there is a feature-level energy optimization phase 510 on a step-wise basis. This is referred to as DDIM-Inversion and is achieved by applying the equation 3 or equation 4, over a fixed number of steps.

$$x_{t+1} = \sqrt{\alpha_{t+1}}\left(\frac{x_t - \sqrt{1-\alpha_t}\,\epsilon_t^{\theta}(t, x_t, y)}{\sqrt{\alpha_t}}\right) + \sqrt{1-\alpha_{t+1}}\,\epsilon_t^{\theta}(t, x_t, y) \quad [3]$$

$$z_{t+1} = \sqrt{\alpha_{t+1}}\left(\frac{z_t - \sqrt{1-\alpha_t}\,\epsilon_t^{\theta}(t, z_t, y)}{\sqrt{\alpha_t}}\right) + \sqrt{1-\alpha_{t+1}}\,\epsilon_t^{\theta}(t, z_t, y) \quad [4]$$

Returning now to the four process flows that are illustrated in FIG. 3, the third and fourth process flows pertain to the computation of an average diffusion loss parameter 364 and an average defect mask loss parameter 358, which are then used to update weights of the convolutional neural network 318 of Text-To-Image Latent Diffusion Model 100.

The third process flow of the overall fine-tuning process 350 refers to blocks 310, 362, and 364. As shown in FIG. 3, the amount of noise that is applied during the execution of noise model 310 may be compared to the learned noise 362 that is learned during the fine-tuning execution of convolutional neural network 318 in order to compute an average diffusion loss parameter 364 of the model.

The fourth process flow of the overall fine-tuning process 350 refers to blocks 302, 352, 356, 358, and 360 of FIG. 3. In order to compute an average defect mask loss parameter 358, a segmentation mask 354 that corresponds to image-based data sample 302 is first generated. In some embodiments, the image-based data sample 302 is provided to a deep segmentation model 352, and the deep segmentation model 352 is then executed to output a segmentation mask 354. For example, the deep segmentation model 352 is Segment Anything Model (SAM) or any applicable segmentation technology.

In some embodiments, segmentation mask 354 may resemble a binary image in which a subset of the pixels of image-based data sample 302 that correspond specifically to the defect of the manufactured product have a pixel magnitude of 255, while other pixels of the binary image have a pixel magnitude of zero. As illustrated in FIG. 3, the defect in the bottom right-hand portion of segmentation mask 354 has a pixel magnitude of 255 while the rest of the image has a pixel magnitude of zero.

Continuing with description of the fourth process flow of the overall fine-tuning process 350, a summation of cross-attention maps 360 at a given spatial resolution 356 is also used to compute the average defect mask loss parameter 358. In some embodiments, and prior to the execution of fine-tuning process 350, a user may determine which spatial resolution of the six spatial resolutions shown in FIG. 3 is to be used when computing the average defect mask loss parameter 358. Such an indication of which particular spatial resolution is to be used may then be provided to the computing devices that are used to execute the Text-To-Image Latent Diffusion Model 100 and compute said parameter 358, as cross-attention maps 360 and segmentation mask 354 refer to the same spatial resolution 356 in order to make such a computation of the average defect mask loss parameter 358. The selected spatial resolution may typically be one-eighth or one-sixteenth of the spatial resolution of the original image-based data sample 302. In particular embodiments (e.g. FIG. 3), the spatial resolution 356 refers to a 64×64 resolution. As shown in FIG. 3, the summation of cross-attention maps 360 at a given spatial resolution 356 and the segmentation mask 354 at spatial resolution 356 of the image-based data sample 302 are then used to compute the average defect mask loss parameter 358.

Following the computation of both the average diffusion loss parameter 364 and the average defect mask loss parameter 358, a fifth process flow of fine-tuning process 350 may also be understood from FIG. 3 in which the parameters are both used to update weights of the convolutional neural network 318 of Text-To-Image Latent Diffusion Model 100. In order to update weights of the model, the average diffusion loss parameter 364 and the average defect mask loss parameter 358 are summed together to determine a total loss parameter of the convolutional neural network 318 of Text-To-Image Latent Diffusion Model 100. The total loss parameter is then optimized using any variant of stochastic gradient descent, such as by applying the Adam optimizer. The optimized total loss parameter is then used when updating one or more of the weights of the convolutional neural network 318 of Text-To-Image Latent Diffusion Model 100. After one or more of the weights have been updated for a plurality of iterations of Adam, the fine-tuned convolutional neural network 318 of Text-To-Image Latent Diffusion Model 100 is used to generate a synthetic image 30, as shown, for example, in FIG. 1.

Figure 4A:
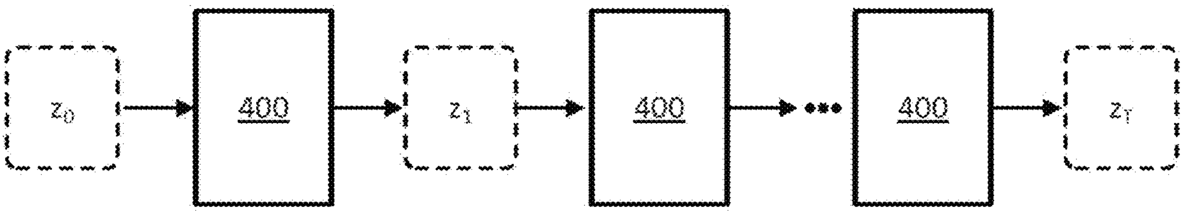
FIG. 4A is a flow diagram that provides an overview of the DDIM inversion process of FIG. 1 according to at least one example embodiment of this disclosure.
Figure 5A:
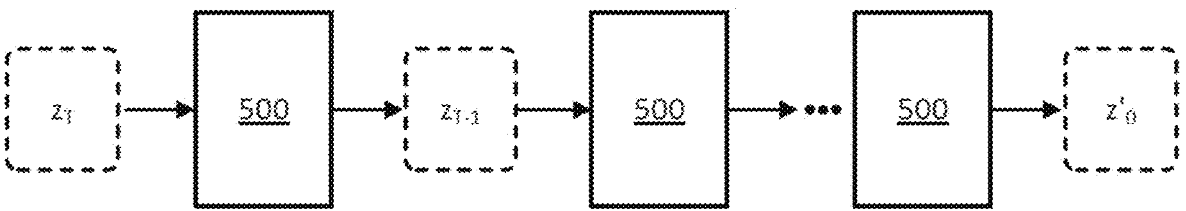
FIG. 5A is a flow diagram that provides an overview of the DDIM generation process of FIG. 1 according to at least one example embodiment of this disclosure.
Figure 5B:
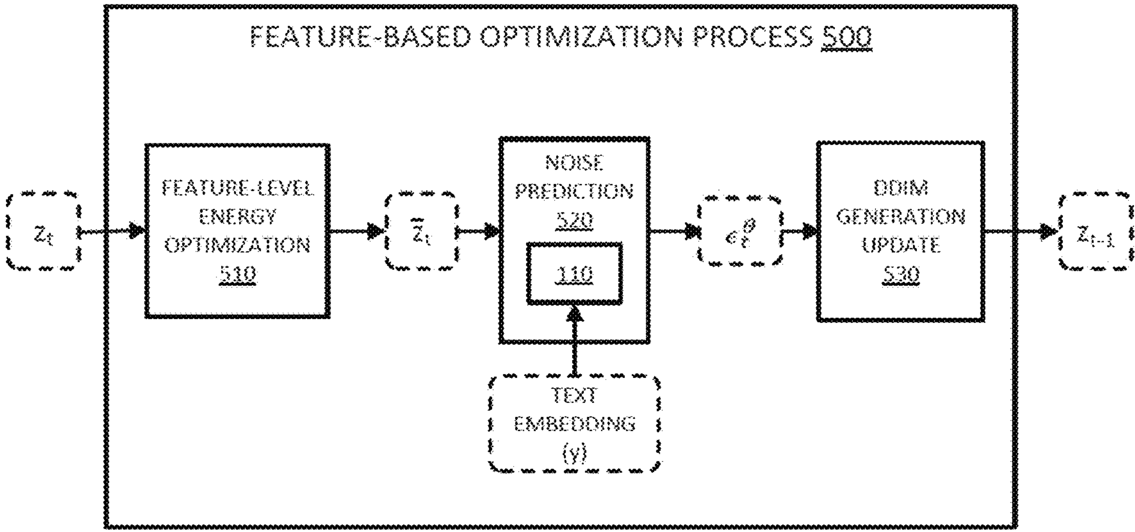
FIG. 5B illustrates aspects of the feature-based optimization process of FIG. 5A according to at least one example embodiment of this disclosure.

FIG. 4A is a flow diagram that provides an overview of the DDIM inversion process. Specifically, FIG. 4A illustrates that the DDIM inversion process involves a number of steps, where T represents an integer number greater than zero. The DDIM inversion process is a forward diffusion process such that the DDIM inversion process advances from timestep t=1 to timestep t=T. Also, as shown in FIG. 4A, the DDIM inversion process includes the noise diffusion process 400 at each timestep.

Figure 4B:
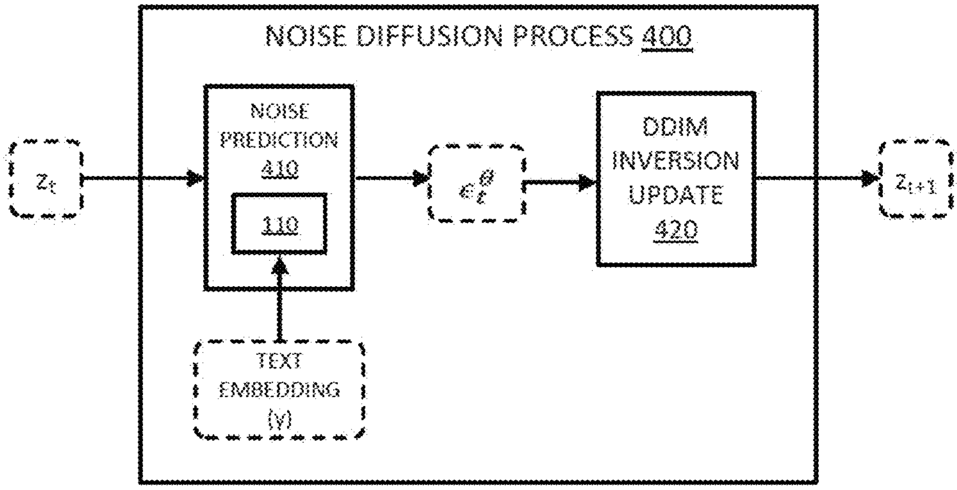
FIG. 4B illustrates aspects of the noise diffusion process that is performed at each step of the DDIM inversion process of FIG. 4A according to at least one example embodiment of this disclosure.

FIG. 4B illustrates aspects of the noise diffusion process 400, which is performed at each step of the forward diffusion process. Specifically, the noise diffusion process 400 advances the DDIM inversion process from one timestep (e.g., t) to a next timestep (t+1) in the forward diffusion process. For example, the noise diffusion process 400 receives input data (e.g., a latent representation of a current version of a noising of the input data 10) at timestep t and generates output data (e.g., a latent representation of a next version of a noising of the input data 10) at timestep t+1.

Next, the noise diffusion process 400 receives input data at timestep t+1 and generates output data at timestep t+2. This process continues until the noise diffusion process 400 receives input data at timestep T−1 and generates output data at timestep T.

As discussed, the noise diffusion process 400 is performed at each step of the DDIM inversion process. The noise diffusion process 400 includes a noise prediction phase 410 and a DDIM inversion update phase 420. However, the noise diffusion process 400 is not limited to those phases shown in FIG. 4B but may include a different number of phases than that shown in FIG. 4B provided that the same functions and/or objectives are achieved.

At the noise prediction phase 410, according to an example, the noise diffusion process 400 includes predicting a noise amount, $$\epsilon_t^{\theta}(t, z_t, y),$$

within a latent representation, $z_t$, at timestep t. The noise prediction phase 410 uses the U-Net 110 to generate the noise amount, $$\epsilon_t^{\theta}(t, z_t, y),$$

as output in response to receiving timestep t, latent representation of a current version, $z_t$ and text embedding, y, as input.

At the DDIM inversion update phase 420, according to an example, the noise diffusion process 400 includes performing a DDIM inversion update via equation 4 to generate a latent representation $z_{t+1}$ at timestep t+1 based on the noise prediction, $$\epsilon_t^{\theta},$$

and a latent representation, $z_t$. After the DDIM inversion update phase 420, the noise diffusion process 400 continues to proceed to another loop of noise prediction phase 410 and DDIM inversion update phase 420, as shown in FIG. 1 and FIG. 4A, to advance the DDIM inversion process from one timestep (e.g., t) to a next timestep, t+1, in the forward diffusion process for each t until t=T. At t=T−1, the DDIM inversion update phase 420 uses equation 4 to generate the latent representation, $z_T$ which then terminates the DDIM Inversion process.

FIG. 5A is a flow diagram that provides an overview of the DDIM generation process of FIG. 1. Specifically, FIG. 5A illustrates that the DDIM generation process involves a number of steps, where T represents an integer number greater than zero. In this example, the DDIM generation process includes the same number, T, of timesteps as the DDIM inversion process. However, in contrast to the DDIM inversion process, the DDIM generation process is a reverse diffusion process such that the DDIM generation process advances from timestep t=T to timestep t=1. For example, when a latent diffusion model is used, then the DDIM generation process uses and processes a denoising of a current version of the latent representation, $z_t$, of the noisy latent $z_T$ at a current timestep t. Alternatively, when a diffusion model is used, then the DDIM generation process uses and processes a current denoised version, $x_t$, of the noisy image, $x_T$, at a current timestep t. Also, as shown in FIG. 5A, the DDIM generation process includes the feature-based optimization process 500 at each timestep.

FIG. 5B illustrates aspects of the feature-based optimization process 500 of FIG. 5A according to an example embodiment. Specifically, the feature-based optimization process 500 advances the DDIM generation process from one timestep (e.g., t) to a next timestep (e.g., t−1) in the reverse diffusion process. For example, the feature-based optimization process 500 receives input data (e.g., latent representation $z_t$) at timestep T and generates output data at timestep T−1. Next, the feature-based optimization process 500 receives input data at timestep T−1 and generates output data at timestep T−2. This process continues until the feature-based optimization process 500 receives input data at timestep t=1 and generates output data at timestep t=0. At timestep t=1, the feature-based optimization process outputs the latent representation, $\acute{z}_0$ which is given to the VAE decoder 140 to output the synthetic image 30, $\acute{x}_0$.

As discussed, the feature-based optimization process 500 is performed at each step of the DDIM generation process. Specifically, the feature-based optimization process 500 includes a feature-level energy optimization phase 510, a noise prediction phase 520, and a DDIM generation update phase 530. However, the feature-based optimization process 500 is not limited to those phases shown in FIG. 5B but may include a different number of phases than that shown in FIG. 5B provided that the same functions and/or objectives are achieved.

At the feature-level energy optimization phase 510, according to an example, the feature-based optimization process 500 includes performing feature-level energy optimization of the input data. The feature-level energy optimization phase 510 is iterative. Specifically, for each current timestep t, the feature-level energy optimization phase 510 includes a number (denoted as N) of iterations, where the first iteration starts at n=1 and the last iteration ends at n=N. In this example, N may be received as input or preset. Prior to beginning the first iteration at n=1, the feature-level energy optimization phase 510 includes initializing $$z_t^o = z_t$$

for per-step optimization. Here the name "per-step" refers to the characteristic of the method wherein the N-iteration optimization is performed for every step t of the DDIM generation process. Each iteration includes (i) computing the energy function, $\varepsilon_{feature}$, using the current iterate $$z_t^{n-1},$$

and (ii) updating to a next iterate, $$z_t^n,$$

by optimizing the gradient of the energy function using the current iterate, $$z_t^{n-1}.$$

As an example, the next iterate, $$z_t^n,$$

is updated using the Adam optimization algorithm, as set forth in TABLE 1. Upon generating the next iterate, then feature-level energy optimization phase 510 updates the value of n by one and proceeds to perform a next iteration using this next iterate. This feature-based energy optimization continues for each iteration until n=N. When the current iteration is n=N, then the feature-level energy optimization phase 510 considers this update to the final iterate, $$z_t^N,$$

as being the optimized iterate that minimizes the energy function, $\varepsilon_{feature}$. At n=N, the feature-level energy optimization phase 510 sets $$\bar{z}_t = z_t^N,$$

where $\bar{z}_t$ represents the optimized iterate.

At the noise prediction phase 520, according to an example, the feature-based optimization process 500 includes generating a noise prediction, $$\epsilon_t^\theta,$$

using $\bar{z}_t$, which is the optimized iterate of the latent representation, $z_t$, at timestep t of denoising the noisy latent, $z_T$. The noise prediction phase 520 uses the U-Net 110 to generate the noise prediction, $$\epsilon_t^\theta(t, \bar{z}_t, y),$$

as output in response to receiving timestep t, optimized iterate $\bar{z}_t$, and text embedding y.

At the DDIM generation update phase 530, according to an example, the feature-based optimization process 500 includes performing a DDIM generation update to generate a latent representation, $z_{t-1}$, of a next version using equation 2.

After the DDIM generation update phase 530, the feature-based optimization process 500 continues to proceed to another loop of the feature-level energy optimization phase 510, the noise prediction phase 520, and the DDIM generation update phase 530 to advance the DDIM generation process from one timestep (e.g., t) to a next timestep (t−1) in the reverse diffusion process for each t until t=1. At t=1, the DDIM update phase 530 generates the completely denoised latent which is denoted as $\acute{z}_0$, and which is computed as $$z_0' = DDIM(\bar{z}_1,\ 1, 0,\ \epsilon_1^\theta(1, \bar{z}_1, y)).$$

This is then converted into a synthetic image 30 using the VAE decoder 140.

In addition, for convenience of reviewing the DDIM generation process of FIG. 5A and FIG. 5B, TABLE 1 includes the pseudocode.

TABLE 1

| Pseudocode for Image Synthesis via DDIM generation process |
|---|
| I. From t = T to t = 1:<br>1. Initialize $z_t^{n=0} = z_t$ for per−step optimization<br>2. Optimize the latent at the current time step t:<br>For n = 1 to N:<br>a. Compute the total energy function, $\varepsilon_{feature}$, using the current iterate $z_t^{n-1}$<br>b. Update the iterate $z_t^n = Adam\left(z_t^{n-1}, \nabla_{z_t^{n-1}} \varepsilon_{feature}\right)$<br>3. Set $\bar{z}_t$ at the current time step $t$ to be the final (i.e., optimized) iterate $z_t^N$<br>4. Perform one step of the DDIM update Zt-1 = DDIM (ZŁ, t, t - 1, $\epsilon_t^\theta(t, \bar{z}_t, y)\big)$ |
| II. Output the synthetic image, $\acute{z}_0$, which is generated via the final DDIM update and which is computed via $z_0' = DDIM\left(\bar{z}_1, 1, 0, \epsilon_1^\theta(1, \bar{z}_1, y)\right)$ |

As discussed above, the DDIM generation process includes the feature-level energy optimization phase 510 to perform feature-based per-step optimization. The feature-level energy optimization phase 510 optimizes the total feature-based energy function, $\varepsilon_{feature}$, using the current iterate $$z_t^{n-1}.$$

Specifically, the total feature-based energy function, $\varepsilon_{feature}$, is computed via equation 5. As indicated in equation 5, the total feature-based energy function, $\varepsilon_{feature}$ is a sum of a first energy component, $\varepsilon_{new\text{-}defect}$, and a second energy component, $\varepsilon_{consistency}$. The energy optimization phase 510 is feature-based in that the energy function is evaluated using feature maps, which are extracted from ResNet layers (i.e., residual blocks within a Residual Neural Network) of the U-Net 110.

$$\mathcal{E}_{feature} = \mathcal{E}_{new-defect} + \mathcal{E}_{consistency} \quad [5]$$

FIG. 6 illustrates aspects of an architecture of the fine-tuned U-Net 110 with respect to the ResNet layers 646, where the feature maps are extracted for the DDIM inversion and generation processes. In general, the architecture of the U-Net includes downsampling layers, a middle layer, and upsampling layers, as shown in FIG. 3. As the input is processed by the U-Net 110, the downsampling layers convert the original input into tensors that have lower spatial resolution but higher channel count. For example, if the input image had a size of (64, 64, 3) which translates to 64×64 pixels (i.e., the spatial resolution) and 3 channels of red, green, and blue (RGB), then in case of a U-Net with three downsampling layers, each layer will serially act upon the input and produce tensors of size (32, 32, 256), (16, 16, 512) and (8, 8, 1024). In this regard, the spatial resolution is halved with every downsampling layer while the channel count doubles after the 1st downsampling layer. This is performed to extract features of increasing levels of abstraction. The upsampling layers reverse the process of the downsampling layers so that the output of the U-Net 110 has the same spatial and channel resolution as the input to the U-Net 110.

Specifically, FIG. 6 shows an enlarged view of a block 630 of intermediate layers 640 associated with a specific spatial resolution, denoted as r. At the spatial resolution of r, the block 630 may represent a sample of downsampling layers 610 or a sample of upsampling layers 620. In this regard, the architecture of the intermediate layers 640 is the same or similar for a sample of downsampling layers 610 and a sample of the upsampling layers 620. As shown in FIG. 6, each intermediate layer 640 includes self-attention (SA) layers 642, cross-attention (CA) layers 644, and ResNet layers 646. The SA layers 642 generate attention scores to determine how much importance each element of the input image is relative to other elements of the input image. The CA layers 644 generate attention scores to determine how much importance each element of the image is relative to the text embedding. The ResNet layers 646 focus on learning the "residual," such as the difference between the input and output of a set of layers. In this regard, the ResNet layers 646 generate feature maps based on the input image. More precisely, the ResNet feature maps are extracted from intermediate layers 640 of the U-Net $$(\epsilon_t^{\theta})$$

architecture. The core feature of the ResNet layer is the Skip connection, which adds the input of a layer to the output of subsequent layers so that information flows though the network.

Different channels in these ResNet feature maps capture different kinds of information about the contents of the input image. For instance, there could be a channel that learns to detect and extract edges or other sharply changing features in the input image. Thus, ResNet feature maps contain richer information as compared to the raw pixels of the input RGB image ($x_0$). In some embodiments, the ResNet feature maps from the upsampling layers are utilized during the image synthesis process at least since the ResNet feature maps from the upsampling layers were found to produce the best results. Additionally or alternatively to extracting and utilizing the ResNet feature maps from the upsampling layers, the ResNet feature maps from the downsampling layers may be extracted and utilized. Specifically, in this particular example, during DDIM Inversion, the ResNet feature maps from the upsampling layers of the U-Net 110 are stored in a memory device 600 for each spatial resolution, as shown by solid arrow in FIG. 6. These ResNet feature maps are later retrieved or extracted from the memory device 600 so that they can be used in the feature-level energy optimization phase 510. Also, ResNet feature maps are stored in the memory device 600 at every timestep, t, of the DDIM Inversion process.

Furthermore, out of all feature-map tensor entries, only certain specific feature-maps encode or capture the desired attributes. Therefore, in order to produce optimal perturbations in the DDIM generation process, the total feature-based energy function, $\varepsilon_{feature}$, is defined based on specific feature-map tensor entries that produce the desired edits/manipulation while leaving all other feature-maps unchanged. Specifically, the feature-based optimization process 500 requires masks to zero-out entries that are not essential with respect to the desired edits/manipulation. The training dataset contains the binary mask image, which can be utilized for the purpose of masking-out these non-essential entries. However, before applying the first segmentation mask 42 (e.g., a binary mask image) to the first source feature map (e.g., ResNet feature map), the segmentation mask 42 needs to be resized to the same predetermined resolution of each stored first feature map in the memory buffer 600A. Also, before applying the second segmentation mask 52 (e.g., a binary mask image) to the second source feature map (e.g., ResNet feature map), the second segmentation mask 52 needs to be resized to the same predetermined resolution of each stored second feature map in the memory buffer 600B.

With feature-based energy optimization 500, the appropriately sized binary mask is multiplied by all of the channels of the stored feature-maps of the same resolution. This overlaying operation zeros-out all of those feature-map entries that are not associated with the defect or the transformed defect after applying the specified transformation ($\mathcal{T}$) to the segmentation mask 42 (e.g., FIG. 7B). The specified transformation ($\mathcal{T}$) may include a set of affine transformations (e.g., one or more affine transformations). In order to produce a manipulated defect with the feature-based approach, the transformation ($\mathcal{T}$) is only required to be applied to the binary mask image and the feature map. The transformation does not need to be applied directly to extracted raw pixels of the source image. As such, there is no need to crop-out the defect from the source image in feature-based energy optimization.

The feature-based optimization process 500 utilizes energy functions, where each energy function focuses on different aspects of the desired edit/manipulation. An energy function may sometimes be referred to as an energy component for being included as a part of $\varepsilon_{feature}$. For example, the first energy function, $\varepsilon_{new\text{-}defect}$, is focused on producing the new defect 30C. Mathematically, $\varepsilon_{new\text{-}defect}$ is defined by equation 6, where, $$\zeta_{t,r}^{o}$$

is the ResNet feature-map at resolution r obtained by passing $x_t$ or $z_t$ through the U-Net 110 to generate $$\epsilon_t^{\theta} = DM(t, x_t, y) \text{ or } \epsilon_t^{\theta} = LDM(t, z_t, y),$$

respectively, where $$\tilde{\zeta}_{t,r}^{o}$$

is the corresponding ResNet feature-map that is obtained by combining the ResNet feature-maps that were stored in the memory device 600 during the DDIM Inversion process. For both terms, $$\zeta_{t,r}^{o} \text{ and } \tilde{\zeta}_{t,r}^{o},$$

the superscript "o" stands for "overlayed," which denotes that these feature maps have been overlayed with the target mask 60 (e.g., a version of the first segmentation mask 42 of the appropriate resolution, r, where the target mask 60, if desired and available, has the set of transformations applied thereto, thereby zeroing-out the non-essential entries.

$$\mathcal{E}_{new\text{-}defect} = \sum_{r=1}^{R} \left(\zeta_{t,r}^{o} - \tilde{\zeta}_{t,r}^{o}\right)^2 \quad [6]$$

Also, in equation 6, $$\tilde{\zeta}_{t,r}^{o}$$

represents the target feature map, which is constructed by first performing DDIM Inversion on both the first source image 40 and the second source image 50 and storing all of their ResNet feature maps, respectively, in memory buffer 600A and memory buffer 600B of a memory device 600 (e.g., memory system 910 of FIG. 9) for each DDIM inversion time step, t, and each resolution, r, of the U-Net 110. Then, depending on the desired blend, the embodiment is configured to combine different amounts of the two ResNet feature maps to produce a target feature map. These two amounts should sum to 1. That is, the target feature map should be a convex combination of the first source feature map and the second source feature map. For example, the target feature map is defined by equation 7, where the superscript 1 in $$\zeta_{t,r}^{1,o}$$

represents the overlayed ResNet feature maps ("first source feature maps") of the first source image 40 at timestep t and resolution r and where superscript 2 in $$\zeta_{t,r}^{2,o}$$

represents the overlayed ResNet feature maps ("second source feature maps") of the second source image 50 at timestep t and resolution r. The same target mask is used as the overlay, denoted as superscript o, for both ResNet feature maps (e.g., the first source feature maps and the second source feature maps). The coefficients, $a_1$ and $a_2$, govern how much of the features of the first defect 40C and how much of the features of the second defect 50C are generated in the new defect 30B ("the blended defect").

$$\tilde{\zeta}_{t,r}^{o} = a_1 \cdot \zeta_{t,r}^{1,o} + a_2 \cdot \zeta_{t,r}^{2,o}, \text{ where } a_1 + a_2 = 1 \quad [7]$$

In addition, the second energy function, $\varepsilon_{consistency}$, is defined by equation 8. Specifically, in this second energy function, the overlay refers to the complement mask 70. The complement mask 70 is a logical complement (i.e., logical NOT) of the target mask 60 (e.g., binary mask image). As aforementioned, the target mask 60 (FIG. 7E) is a version of the first segmentation mask 42 with one or more specified transformations, if available, and which is resized to a spatial resolution r to match the spatial resolution of the corresponding ResNet feature map stored in the memory device 600. The second energy function, $\Sigma_{consistency}$, performs the computations using the ResNet feature maps stored in the memory device 600 instead of raw-pixels of the input image 10.

$$\mathcal{E}_{consistency} = \left(\zeta_t^{o} - \zeta_{target}^{o}\right)^2 \quad [8]$$

Figure 7A:
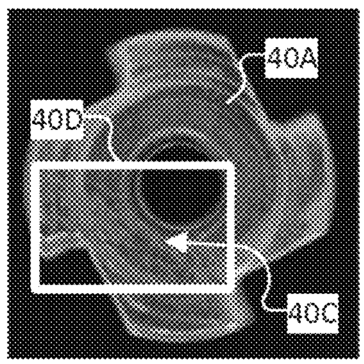
FIG. 7A and FIG. 7B illustrate an example of a source image and its corresponding segmentation mask according to at least one example embodiment of this disclosure.
Figure 7B:
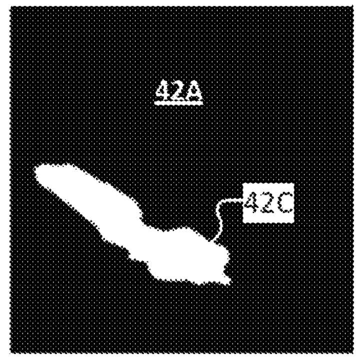

FIG. 7A and FIG. 7B are digital images, which are taken from a training dataset (e.g., finetuning dataset of FIG. 3) and which are non-limiting examples that relate specifically to the image synthesis process shown in FIG. 1. In this example, FIG. 7A is a real image (i.e., non-synthetic image), which is captured by an image sensor or camera. This real image may be referred to as a first source image 40. In this non-limiting example, the first source image 40 displays a real object 40A (e.g., metal nut) with a real first defect 40C (e.g., tiny scratch). For ease of viewing the first defect 40C, the first source image 40 also displays a bounding box 40D indicative of a region of the first defect 40C. Meanwhile, FIG. 7B illustrates a first segmentation mask 42 corresponding to the first source image 40. The first segmentation mask 42 is a binary mask image, where each pixel relating to an image segment 42C of the first defect 40C is assigned a predetermined value and where remaining pixels 42A are assigned another predetermined value. For example, as shown in FIG. 7B, the segmentation mask 42 displays the image segment 42C of the first defect 40C as white pixels (i.e. pixel magnitude of 255) and the remaining pixels 42A as black pixels (i.e., pixel magnitude of 0). Also, as an example, the first segmentation mask 42 may assign a value of 1 to each pixel associated with the image segment of the defect 42B and a value of zero to each of the remaining pixels 42A. As such, when the first segmentation mask 42 is overlayed on (i.e., multiplied to) another digital image (e.g., feature map), the first segmentation mask 42 is configured to zero out or mask non-relevant portions of the feature map, thereby enabling the focus and action to be placed on the image segment 42C corresponding to the first defect 40C. The first source image 40 and its corresponding first segmentation mask 42 are used in the DDIM generation process to generate the synthetic image 30 of FIG. 1.

Figure 7C:
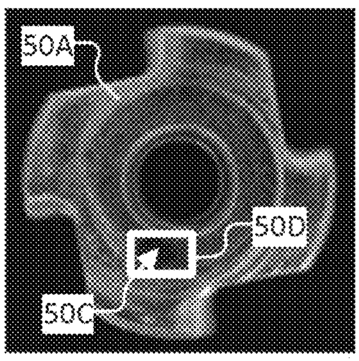
FIG. 7C and FIG. 7D illustrate another example of a source image and its corresponding segmentation mask according to at least one example embodiment of this disclosure.
Figure 7D:
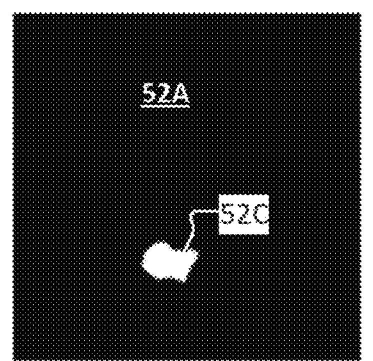

FIG. 7C and FIG. 7D are digital images, which are taken from a training dataset (e.g., finetuning dataset of FIG. 3) and which are non-limiting examples that relate specifically to the image synthesis process shown in FIG. 1. In this example, FIG. 7C is a real image (i.e., non-synthetic image), which is captured by an image sensor or camera. This real image may be referred to as a second source image 50. In this non-limiting example, the second source image 50 displays a real object 50A (e.g., metal nut) with a real second defect 50C (e.g., discolored region). For ease of viewing the second defect 50C, the second source image 50 also displays a bounding box 50D indicative a region of the second defect 50C. Meanwhile, FIG. 7B illustrates a second segmentation mask 52 corresponding to the second source image 50. The second segmentation mask 52 is a binary mask image, where each pixel relating to an image segment 52C of the second defect 50C is assigned a predetermined value and where remaining pixels 52A are assigned another predetermined value. For example, as shown in FIG. 7C, the second segmentation mask 52 displays the second image segment 52C of the second defect 50C as white pixels (i.e. pixel magnitude of 255) and the remaining pixels 52A as black pixels (i.e., pixel magnitude of 0). Also, as an example, the second segmentation mask 52 may assign a value of 1 to each pixel associated with the image segment of the defect 42B and a value of zero to each of the remaining pixels 42A. These black pixels (e.g., pixel magnitude of 0) are considered to mask the object 50A. As such, when the first segmentation mask 52 is overlayed on (e.g., multiplied to) another digital image (e.g., feature map), the second segmentation mask 52 is configured to zero out or mask non-relevant portions of the feature map, thereby enabling the focus and action to be placed the image segment 52C corresponding to the second defect 50C. The second source image 50 and its corresponding second segmentation mask 52 are used in the DDIM generation process to generate the synthetic image 30 of FIG. 1.

Figure 7E:
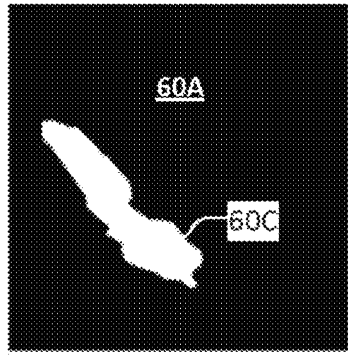
FIG. 7E illustrates an example of a target mask according to at least one example embodiment of this disclosure.

FIG. 7E illustrates an example of a target mask 60 according to at least one example embodiment of this disclosure. As shown in FIG. 7E, the target mask 60 is a segmentation mask, such as a binary mask image. The target mask 60 is a version of either (i) the first segmentation mask 42 if the first image segment 42C is larger in size than the second image segment 52C or (ii) the second segmentation mask 52 if the second image segment 52C is larger than the first image segment 42C, where the version is generated by applying any available transformations. For instance, in this example, the target mask 60 is a transformed version of the first segmentation mask 42 since the first image segment 42C is larger than the second image segment 52C. In this case, the target mask 60 is the first segmentation mask 42 with a small displacement and/or rotation applied to the first segmentation mask 42.

Figure 7F:
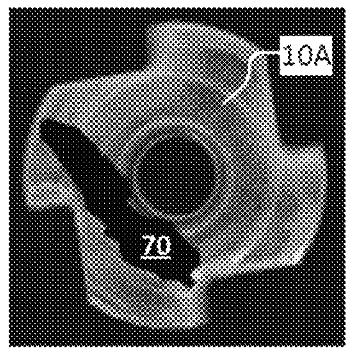
FIG. 7F illustrates an example of a complement mask overlayed on the input image of FIG. 1 according to at least one example embodiment of this disclosure.

FIG. 7F illustrates an example of a complement mask 70 overlayed on the input image 10 as a visualization of the concept behind the complement mask 70 being overlayed on the input feature map, as expressed in $\varepsilon_{consistency}$. As shown in FIG. 7F, the complement mask 70 is a logical complement (e.g., logical NOT operation) of the target mask 60. Specifically, in this example, the complement mask 70 assigns a predetermined value (e.g., zero) to each pixel associated with the image segment of the first defect 42C such that these pixels are masked (e.g., zeroed-out), thereby enabling the focus to be on the remaining pixels to ensure that there is consistency when reconstructing remaining portions of the input image 10. As shown in FIG. 7F, by masking the pixels associated with a rendering of the new defect 30B via assigning a predetermined value of zero to those pixels, this masked result displays the remaining pixels (i.e., the pixels that do not correspond to the image segment of the defect) of the input image 10 and thus serves a reference for how these remaining pixels should appear in the synthetic image 30. That is, the complement mask 70 overlayed on the input image 10 (or the input feature map) is configured to serve as a reference that ensures that the remaining pixels remain consistent and not changed from the input image 10 when generating the synthetic image 30 during the DDIM generation process.

Figure 8:
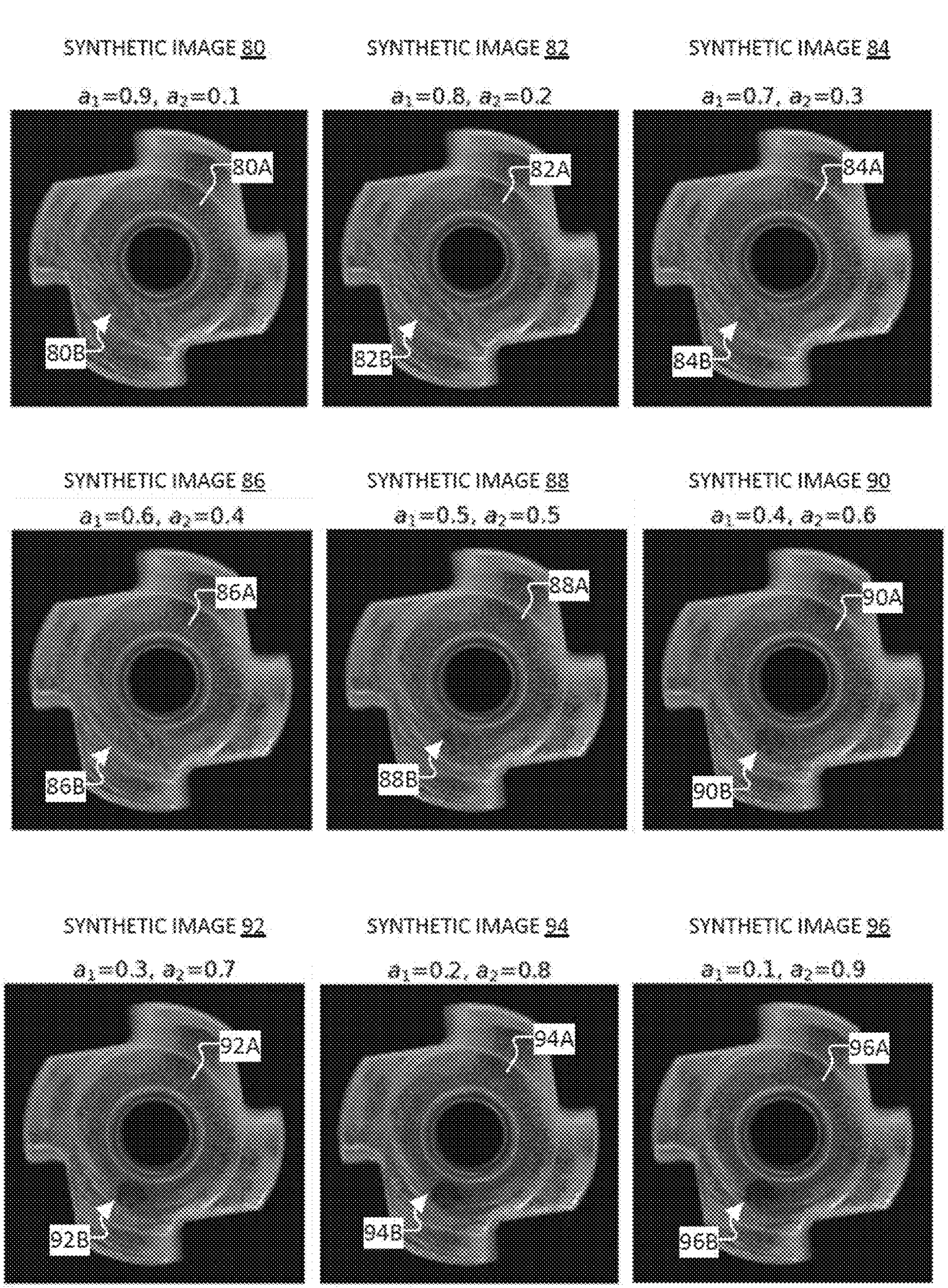
FIG. 8 illustrate examples of synthetic images with different variations of blended defects that may be generated via the image synthesis process of FIG. 1 according to at least one example embodiment of this disclosure.

FIG. 8 illustrate non-limiting examples of different synthetic images with different variations of the new defects that may be generated via the image synthesis process of FIG. 1 using the same input image 10, the same text embedding 20, the same first source image 40, the same first segmentation mask 42, the same second source image 50, and the same second segmentation mask 52 by simply varying the coefficients, $a_1$ and $a_2$, which are used in $$\zeta_{t,r}^{o}.$$

In this regard, $a_1$ is associated with the first defect 40C and $a_2$ is associated with the second defect 50C. For example, the synthetic image 80 displays an object 80A with a new defect 80B, which is a blended defect generated when $a_1$=0.9 and $a_2$=0.1 The synthetic image 82 displays an object 82A with a new defect 82B, which is a blended defect generated when $a_1$=0.8 and $a_2$=0.2. The synthetic image 84 displays an object 84A with a new defect 84B, which is a blended defect generated when $a_1$=0.7 and $a_2$=0.3. The synthetic image 86 displays an object 86A with a new defect 86B generated when $a_1$=0.6 and $a_2$=0.4. The synthetic image 88 displays an object 88A with a new defect 88B, which is a blended defect generated when $a_1$=0.5 and $a_2$=0.5. The synthetic image 90 displays an object 90A with a new defect 90B, which is a blended defect generated when $a_1$=0.4 and $a_2$=0.6. The synthetic image 92 displays an object 92A with a new defect 92B, which is a blended defect generated when $a_1$=0.3 and $a_2$=0.7. The synthetic image 94 displays an object 94A with a new defect 94B, which is a blended defect generated when $a_1$=0.2 and $a_2$=0.8. The synthetic image 96 displays an object 96A with a new defect 96B, which is a blended defect generated when $a_1$=0.1 and $a_2$=0.9.

As aforementioned and as shown in FIG. 8, the coefficients, $a_1$ and $a_2$, of equation 7, govern how much the blended defect is generated with respect to features from the first source image 40 and features of the second source image 50. For instance, in FIG. 8, $a_1$ is associated with the first defect (e.g., scratch) of the first source image 40 and $a_2$ is associated with the second defect (e.g., discolored region) of the second source image 50. As such, when $a_1$ is greater than $a_2$, then the blended defect displays the first defect (e.g., scratch) in a greater amount and/or more pronounced features than the second defect (e.g., discolored region), as shown in synthetic image 80, synthetic image 82, synthetic image 84, and synthetic image 86. In contrast, when $a_2$ is greater than $a_1$, then the blended defect displays the second defect (e.g., discolored region) in a greater amount and/or more pronounced features than the first defect (e.g., scratch), as shown in synthetic image 90, synthetic image 92, synthetic image 94, and synthetic image 96. Also, when $a_1$ is equal to $a_2$, then the blended defect displays the first defect (e.g., scratch) in an equal amount and strength as the second defect (e.g., discolored region), as shown in synthetic image 88. As demonstrated by FIG. 8, the image synthesis process is advantageous in being configured to create a desired blended defect, as customized and desired by the user, by adjusting the two coefficients of equation 7.

Figure 9:
FIG. 9 illustrates an example of a system that is configured to perform the image synthesis process of FIG. 1 according to at least one example embodiment of this disclosure.
Figure 9:
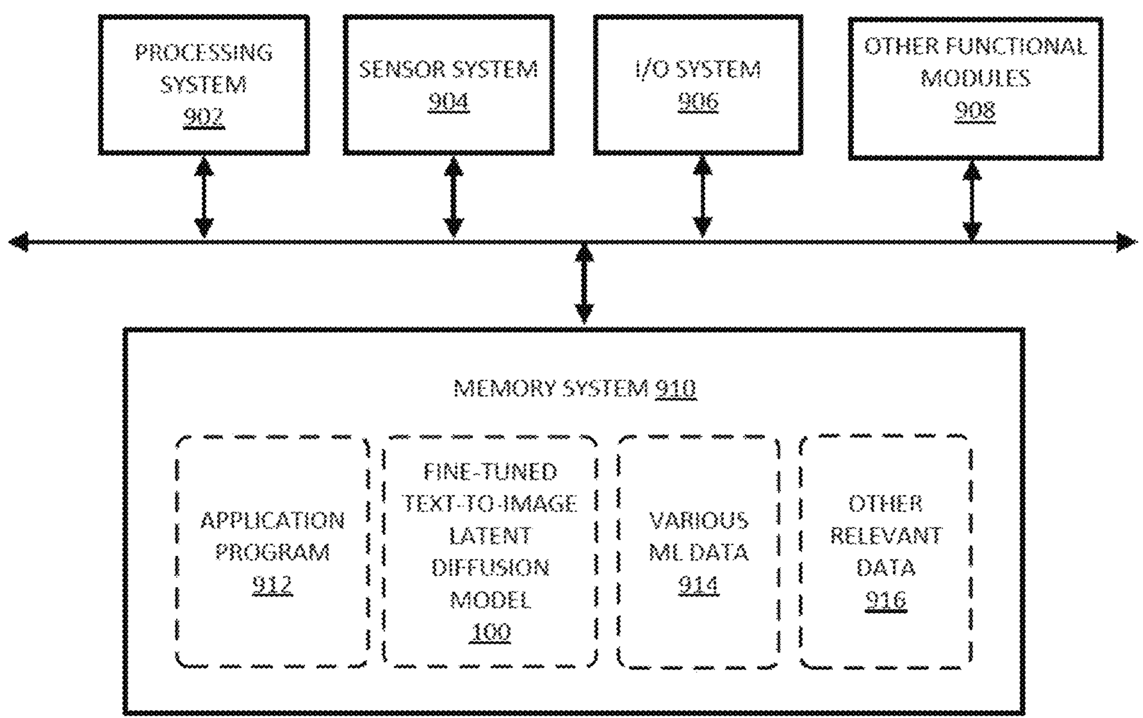

FIG. 9 is a diagram of an example of a system 900 with a finetuned Text-to-Image Latent Diffusion Model 100 according to an example embodiment. In another example, the system 900 includes a finetuned Text-to-Image Diffusion Model in place of the Text-to-Image Latent Diffusion Model 100. The system 900 includes at least a processing system 902. The processing system 902 includes one or more processing devices. For example, the processing system 902 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 902 is operable to provide the functionality as described herein.

The system 900 includes at least a memory system 910, which is operatively connected to the processing system 902. The memory system 910 is in data communication with the processing system 902. In an example embodiment, the memory system 910 includes at least one non-transitory computer readable medium, which is configured to store and provide access to various data to enable at least the processing system 902 to perform the operations and functionality, as disclosed herein. In an example embodiment, the memory system 910 comprises a single device or a plurality of devices. The memory system 910 can include electrical, electronic, magnetic, optical, semiconductor, electromagnetic, or any suitable storage technology that is operable with the system 900. For instance, in an example embodiment, the memory system 910 can include random access memory (RAM), read only memory (ROM), flash memory, a disk drive, a memory card, an optical storage device, a magnetic storage device, a memory module, any suitable type of memory device, or any combination thereof.

The memory system 910 includes at least the finetuned Text-to-Image Latent Diffusion Model 100, an application program 912, various machine learning (ML) data 914, and other relevant data 916, which are stored thereon. The memory system 910 includes computer readable data that, when executed by the processing system 902, is configured provide the functions and processes (e.g., FIG. 1, FIG. 3, FIG. 4A-4B, FIG. 5A-5B, etc.) as described in the present disclosure. The computer readable data can include instructions, code, routines, various related data, any software technology, or any number and combination thereof. Specifically, the application program 912 includes computer readable data with instructions, which when executed by the processing system 902, is configured to provide an application platform for the finetuned Text-to-Image Latent Diffusion Model 100 to operate with other components of the system 900 and interface with a user. Also, the finetuned Text-to-Image Latent Diffusion Model 100 includes computer readable data with instructions, which when executed by the processing system 902, is configured to perform image synthesis and generate synthetic defects and/or synthetic images, as described in this disclosure. Also, the various ML data 914 includes various training data, various loss data, various weight data and/or parameter data, as well as any related machine learning data that enables the system 900 to perform the functions as disclosed in this disclosure. For example, the various training data includes at least the finetuning dataset for finetuning the Text-to-Image Latent Diffusion Model 100. The various training data may also include a new dataset that includes at least the synthetic images, which are generated by the finetuned Text-to-Image Latent Diffusion Model 100. The various training data may also include source images, segmentation masks, input images, text data, and various other images/data. Meanwhile, the other relevant data 916 provides various data (e.g. operating system, etc.), which enables the system 900 to perform the functions as discussed herein.

In an example embodiment, as shown in FIG. 9, the system 900 is configured to include at least one sensor system 904. The sensor system 904 includes one or more sensors. For example, the sensor system 904 includes an image sensor or a camera. The sensor system 904 may also include a radar sensor, a light detection and ranging (LIDAR) sensor, a thermal sensor, an ultrasonic sensor, an infrared sensor, a motion sensor, an audio sensor, an inertial measurement unit (IMU), any suitable sensor, or any combination thereof. The sensor system 904 is operable to communicate with one or more other components (e.g., processing system 902 and memory system 910) of the system 900. More specifically, for example, the processing system 902 is configured to obtain the sensor data directly or indirectly from at least one sensor. The sensor system 904 and/or the processing system 902 is configured to generate digital images. The processing system 902 is configured to process digital images in connection with the finetuned Text-to-Image Latent Diffusion Model 100 and the various ML data 914.

In addition, the system 900 includes other components that contribute to the finetuned Text-to-Image Latent Diffusion Model 100. For example, as shown in FIG. 9, the memory system 910 is also configured to store other relevant data 916, which relates to operation of one or more components (e.g., sensor system 904, an input/output (I/O) system 906, and other functional modules 908). In addition, the I/O system 906 includes an I/O interface and may include one or more devices (e.g., display device, keyboard device, speaker device, etc.). Also, the system 900 includes other functional modules 908, such as any appropriate hardware technology, software technology, or combination thereof that assist with or contribute to the functioning of the system 900. For example, the other functional modules 908 include communication technology that enables components of the system 900 to communicate at least with each other, as described herein. The communication technology may enable the system 900 to communicate with other network devices (not shown) over a communication network. With at least the configuration discussed in the example of FIG. 9, the system 900 is configured to enable the finetuned Text-to-Image Latent Diffusion Model 100 to perform the functions as discussed in this disclosure.

Figure 10:
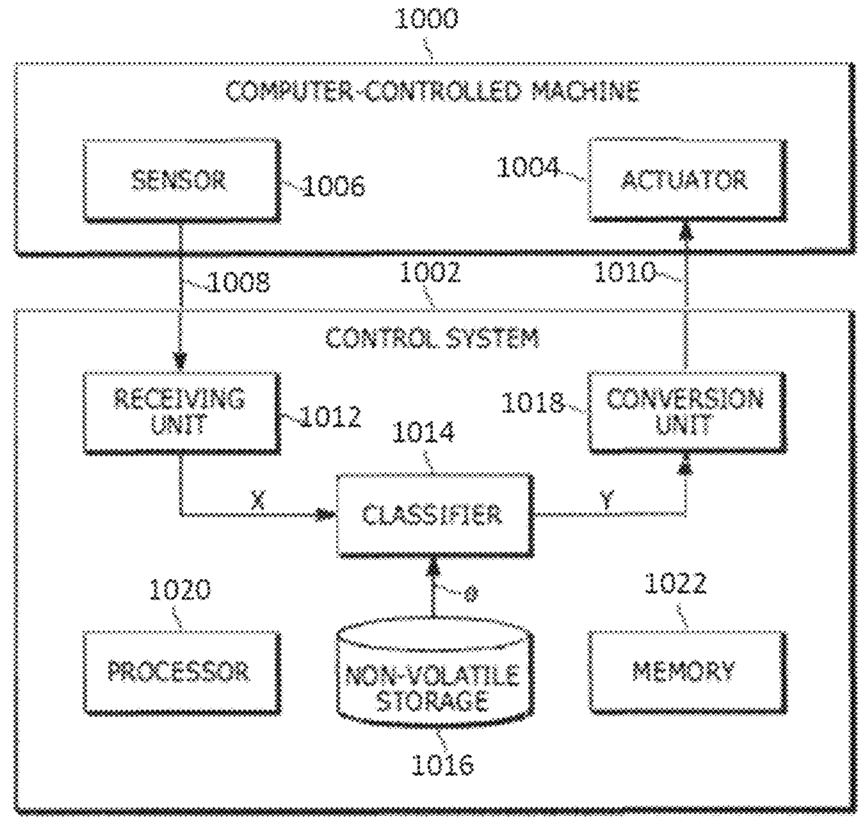
FIG. 10 illustrates a schematic diagram of an interaction between computer-controlled machine and control system according to at least one example embodiment of this disclosure.

FIG. 10 illustrates a schematic diagram of an interaction between computer-controlled machine 1000 and control system 1002 according to another example embodiment. Computer-controlled machine 1000 includes actuator 1004 and sensor 1006. Actuator 1004 may include one or more actuators and sensor 1006 may include one or more sensors. Sensor 1006 is configured to sense a condition of computer-controlled machine 1000. Sensor 1006 may be configured to encode the sensed condition into sensor signals 1008 and to transmit sensor signals 1008 to control system 1002. A non-limiting example of sensor 1006 includes video, radar, LiDAR, an ultrasonic sensor, an image sensor, an audio sensor, a motion sensor, etc. In some embodiments, sensor 1006 is an image sensor or an optical sensor configured to provide digital images of an environment proximate to computer-controlled machine 1000.

Control system 1002 is configured to receive sensor signals 1008 from computer-controlled machine 1000. As set forth below, control system 1002 may be further configured to compute actuator control commands 1010 depending on the sensor signals and to transmit actuator control commands 1010 to actuator 1004 of computer-controlled machine 1000.

As shown in FIG. 10, control system 1002 includes receiving unit 1012. Receiving unit 1012 may be configured to receive sensor signals 1008 from sensor 1006 and to transform sensor signals 1008 into input signals x. In an alternative embodiment, sensor signals 1008 are received directly as input signals x without receiving unit 1012. Each input signal x may be a portion of each sensor signal 1008. Receiving unit 1012 may be configured to process each sensor signal 1008 to product each input signal x. Input signal x may include data corresponding to a digital image recorded by sensor 1006.

Control system 1002 includes classifier 1014. In this example, the classifier 1014 is a machine learning model that is pretrained, trained, finetuned, tested, and/or validated by a dataset, which includes synthetic images that are generated by the image synthesis process of FIG. 1. The classifier 1014 may be configured to classify input signals x into one or more labels using ML algorithms. Classifier 1014 is configured to be parametrized by parameters θ. Parameters θ may be stored in and provided by non-volatile storage 1016. Classifier 1014 is configured to determine output signals y from input signals x. Each output signal y includes information that assigns one or more labels to each input signal x. Classifier 1014 may transmit output signals y to conversion unit 1018. Conversion unit 1018 is configured to covert output signals y into actuator control commands 1010. Control system 1002 is configured to transmit actuator control commands 1010 to actuator 1004, which is configured to actuate computer-controlled machine 1000 in response to actuator control commands 1010. In some embodiments, actuator 1004 is configured to actuate computer-controlled machine 1000 based directly on output signals y.

Upon receipt of actuator control commands 1010 by actuator 1004, actuator 1004 is configured to execute an action corresponding to the related actuator control command 1010. Actuator 1004 may include a control logic configured to transform actuator control commands 1010 into a second actuator control command, which is utilized to control actuator 1004. In one or more embodiments, actuator control commands 1010 may be utilized to control a display instead of or in addition to an actuator.

In some embodiments, control system 1002 includes sensor 1006 instead of or in addition to computer-controlled machine 1000 including sensor 1006. Control system 1002 may also include actuator 1004 instead of or in addition to computer-controlled machine 1000 including actuator 1004. As shown in FIG. 10, control system 1002 also includes processor 1020 and memory 1022. Processor 1020 may include one or more processors. Memory 1022 may include one or more memory devices. The classifier 1014 of one or more embodiments may be implemented by control system 1002, which includes non-volatile storage 1016, processor 1020, and memory 1022.

Non-volatile storage 1016 may include one or more persistent data storage devices such as a hard drive, optical drive, tape drive, non-volatile solid-state device, cloud storage or any other device capable of persistently storing information. Processor 1020 may include one or more devices selected from high-performance computing (HPC) systems including high-performance cores, graphics processing units, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 1022. Memory 1022 may include a single memory device or a number of memory devices including, but not limited to, RAM, ROM, volatile memory, non-volatile memory, static random access memory (SRAM), dynamic random access memory (DRAM), flash memory, cache memory, or any other device capable of storing information.

Processor 1020 is configured to read into memory 1022 and execute computer-executable instructions residing in non-volatile storage 1016 and embodying one or more ML algorithms and/or methodologies of one or more embodiments. Non-volatile storage 1016 may include one or more operating systems and applications. Non-volatile storage 1016 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 1020, the computer-executable instructions of non-volatile storage 1016 may cause control system 1002 to implement one or more of the ML algorithms and/or methodologies to employ the classifier 1014 as disclosed herein. Non-volatile storage 1016 may also include ML data (including model parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes, layers, or blocks than those illustrated consistent with one or more embodiments. Furthermore, the processes, methods, or algorithms can be embodied in whole or in part using suitable hardware components, such as ASICs, FPGAs, state machines, controllers or other hardware components or devices, or a combination of hardware, software and firmware components.

Figure 11:
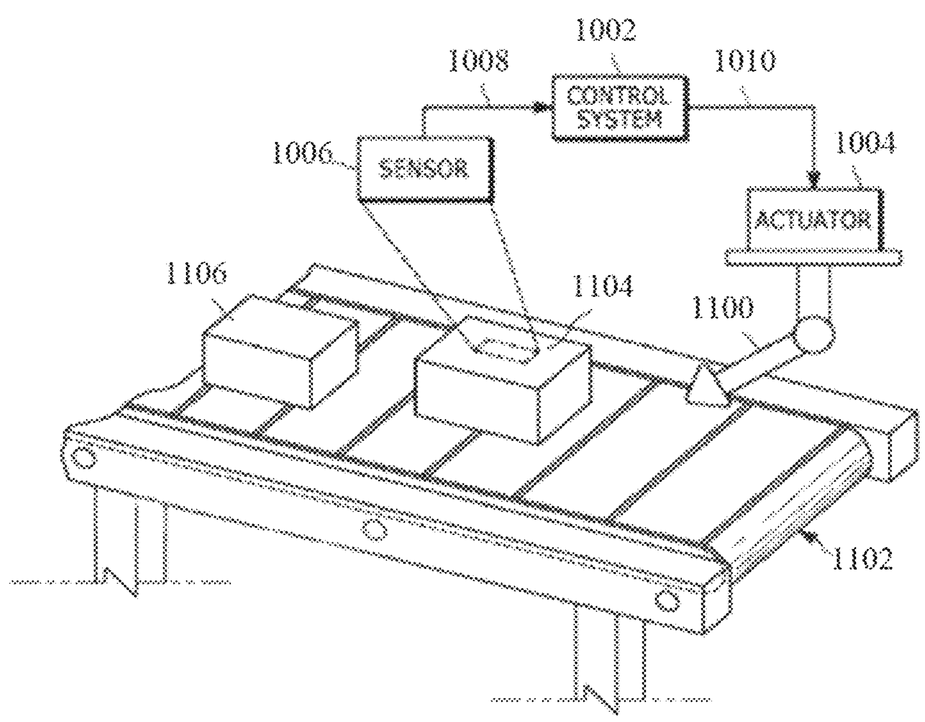
FIG. 11 illustrates a schematic diagram of control system configured to control a manufacturing machine according to at least one example embodiment of this disclosure.

FIG. 11 illustrates a schematic diagram of control system 1002 configured to control a system 1100 (e.g., manufacturing machine or a manufacturing assembly) or an AOI system. In addition, the control system 1002 is configured to control an actuator 1004, which is configured to control one or more actions associated with the system 1100.

Referring to FIG. 11, sensor 1006 includes one or more image sensors that capture digital images of objects (e.g., products or one or more portions thereof) that are at (i) a particular manufacturing stage, and/or (ii) a particular time in which these are objects are inspected for quality control purposes. Also, in this application, the classifier 1014 is configured to classify an image as being anomalous upon determining that the image includes an abnormality (e.g., defect, scratch, dent, protrusion, etc.), which is above a threshold for quality control inspection. Alternatively, the classifier 1014 is configured to classify that image as being, non-anomalous upon determining that (i) the image is normal and does not include an abnormality or (ii) the image contains an abnormality that is equal to or below the threshold for quality control inspection.

Actuator 1004 is configured to control the system 1100 (e.g., manufacturing machine) depending on the determined state (e.g., anomalous classification or non-anomalous classification) of a product 1104 or one or more portions thereof. The actuator 1004 may control functions of system 1100 (e.g., manufacturing machine) with respect to subsequent manufactured products 1106 of system 1100 (e.g., manufacturing machine) depending on the determined state of the product 1104. For example, when the control system 1002 determines, via the classifier 1014, that there is an anomaly (e.g. defect) associated with product 1104, then the control system 1002 is configured to instruct actuator 1004 to control the system 1100 such that the product 1104 is removed from the production line 1102 for further inspection. In another example, the control system 1002 is configured to halt a movement of the production line 1102 while awaiting further inspection of manufactured product 1104. In such examples, the inspection of manufactured product 1106 may be paused until the state of manufactured product 1104 is determined.

Figure 12:
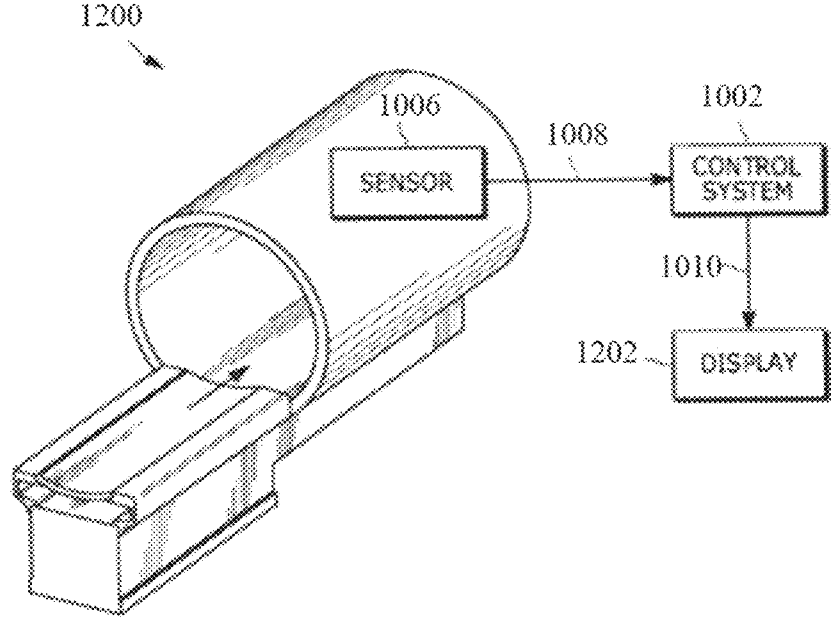
FIG. 12 is a diagram of an example of control system configured to control an imaging system according to at least one example embodiment of this disclosure.

FIG. 12 illustrates a schematic diagram of control system 1002 configured to control imaging system 1200, for example a magnetic resonance imaging (MRI) apparatus, x-ray imaging apparatus or ultrasonic apparatus. Sensor 1006 may, for example, be an imaging sensor. Classifier 1014 may be configured to determine a classification of all or part of the sensed image. As an example, in this case relating to medical imaging, the classifier 1014 is trained or finetuned on a more balanced training dataset that includes synthetic images, which include synthesized medical abnormalities that are generated by the image synthesis process of FIG. 1. Moreover, in this case, the Text-to-Image Latent Diffusion is finetuned on actual medical images with abnormalities to be specialized for this task. Also, in this case relating to medical imaging, each synthetic image displays at least a portion of a relevant body part as an object and a medical abnormality as the synthesized defect on that body part. The actuator control command 1010 is selected based on the classification obtained from the classifier 1014. For example, classifier 1014 may interpret a region of a digital image to be potentially anomalous or to have an anomalous feature (e.g., defect). In this case, the actuator control command 1010 may be selected to cause display 1202 to display the digital image and highlight the potentially anomalous region or anomalous feature (e.g., defect).

As discussed in this disclosure, the embodiments include a number of advantageous features, as well as benefits. For example, each embodiment includes a novel approach to synthesizing defects on objects of digital images by framing the task as an image editing problem. In addition, the embodiments are enabled to generate a blended defect, which includes a combination of a first amount of a first defect and a second amount of a second defect to a target region. This is a novel, as there does not appear to be any similar efforts to blend defects together which is also a potentially occurring reality in various applications (e.g., real manufacturing settings, real medical settings, etc.). This disclosure addresses this issue by providing a new capability to generate different kinds of defects to the same location on a synthetic image.

The embodiments are also advantageous in that they employ an energy function, which are based on intermediate features (e.g., ResNet feature maps) of the diffusion-based model (e.g., U-Net 110). Features of the diffusion-based model capture rich and abstract representations of different attributes in the digital images. These different attributes include attributes of interest, such as defects or anomalies, on objects. Specifically, this feature-level supervision offers two key advantages over pixel-level supervision: (i) the feature-level supervision allows for the seamless transfer of defect representations across different images by manipulating the learned abstract features, rather than needing precise pixel alignment, and (ii) the feature-level supervision significantly accelerates optimization of diffusion latent representations at the feature level compared to pixel-level supervision. Feature-level supervision not only improves efficiency, but also enhances the flexibility and adaptability of the defect synthesis process with respect to the overall image synthesis process.

Furthermore, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally, or alternatively, components and functionality may be separated or combined differently than in the manner of the various described embodiments and may be described using different terminology. These and other variations, modifications, additions, and improvements may fall within the scope of the disclosure as defined in the claims that follow.

The invention claimed is:

1. A computer-implemented method for image synthesis comprising:

receiving an input image that displays an object;

receiving (i) a first source image that displays a first defect and (ii) a corresponding first segmentation mask that includes a first predetermined value assigned to each pixel of a first image segment of the first defect and a second predetermined value assigned to remaining pixels of the first segmentation mask;

receiving (i) a second source image that displays a second defect and (ii) a corresponding second segmentation mask that includes the first predetermined value assigned to each pixel of a second image segment of the second defect and the second predetermined value assigned to remaining pixels of the second segmentation mask;

generating, via a machine learning model, a first source feature map based on a latent representation of the first source image at each step of a forward diffusion process;

generating, via the machine learning model, a second source feature map based on a latent representation of the second source image at each step of the forward diffusion process;

generating a target feature map by combining (i) a first masked feature map that is the first source feature map overlayed with the first segmentation mask and (ii) a second masked feature map that is the second source feature map overlayed with second the segmentation mask;

generating, via the forward diffusion process involving the machine learning model, a noisy latent representation of the input image;

generating, via a reverse diffusion process involving the machine learning model, a new latent representation by denoising the noisy latent representation in a plurality of steps, the plurality of steps including a current step that (i) minimizes an energy function to generate an optimized iterate of a current version of denoising the noisy latent representation, the energy function including at least a first energy component that compares differences between (a) a masked current feature map, the masked current feature map being the current feature map overlayed with the segmentation mask, the current feature map generated by the machine learning model based on the current version and (b) the target feature map of the current step, (ii) predicts, via the machine learning model, a current amount of noise in the optimized iterate, and (iii) generates a next version using the current amount of noise and the optimized iterate; and decoding the new latent representation to generate a synthetic image, wherein the synthetic image displays the object with a new defect, the new defect including a combination of a rendition of the first defect and a rendition of the second defect.

2. The computer-implemented method of claim 1, wherein a size of the first defect is larger than a size of the second defect.

3. The computer-implemented method of claim 1, wherein the machine learning model is a Text-to-Image Latent Diffusion Model.

4. The computer-implemented method of claim 1, wherein:

the machine learning model includes a finetuned U-Net; and the source feature map is extracted from ResNet layers of the finetuned U-Net during each step of the forward diffusion process.

5. The computer-implemented method of claim 1, wherein the target feature map is generated by a convex combination of the first masked feature map and the second masked feature map for each step of the forward diffusion process.

6. The computer-implemented method of claim 1, further comprising:

extracting an input feature map that is generated by the machine learning model during the forward diffusion process;

generating a complement mask that is a logical complement of the first segmentation mask;

generating a complement feature map by overlaying the complement mask on the input feature map; and generating a current result by overlaying the complement mask on the current feature map, wherein, the energy function is a sum of the first energy component and a second energy component, and the second energy component compares differences between (i) the current result and (ii) the complement feature map.

7. The computer-implemented method of claim 1, wherein the energy function is minimized over a predetermined number of iterations to generate the optimized iterate.

8. The computer-implemented method of claim 1, wherein:

the first predetermined value is greater than zero; and the second predetermined value is zero.

9. The computer-implemented method of claim 1, wherein the first defect is a different type of physical flaw on the object than the second defect.

10. The computer-implemented method of claim 1, further comprising:

receiving a set of transformations to be applied when generating the new defect; and applying the set of transformations to the first source image, the first segmentation mask, the second source image, and the second segmentation mask before generating the first source feature map and the second source feature map such that the first source feature map and the second source feature map are generated with the set of transformations via the first source image the second source image, wherein the synthetic image displays the new defect with the set of transformations.

11. A computer-implemented method for image synthesis comprising:

receiving an input image that displays an object;

receiving (i) a first source image that displays a first defect and (ii) a corresponding first segmentation mask that includes a first predetermined value assigned to each pixel of a first image segment of the first defect and a second predetermined value assigned to remaining pixels of the first segmentation mask;

receiving (i) a second source image that displays a second defect and (ii) a corresponding second segmentation mask that includes the first predetermined value assigned to each pixel of a second image segment of the second defect and the second predetermined value assigned to remaining pixels of the second segmentation mask;

generating, via a machine learning model, a first source feature map based on the first source image at each step of a forward diffusion process;

generating, via the machine learning model, a second source feature map based on the second source image at each step of the forward diffusion process;

generating a target feature map by combining (i) a first masked feature map that is the first source feature map overlayed with the first segmentation mask and (ii) a second masked feature map that is the second source feature overlayed with second the segmentation mask;

generating, via the forward diffusion process involving the machine learning model, a noisy input image;

generating, via a reverse diffusion process involving the machine learning model, a synthetic image by denoising the noisy input image in a plurality of steps, the plurality of steps including a current step that (i) minimizes an energy function to generate an optimized iterate of a current version of denoising the noisy input image, the energy function including at least a first energy component that compares differences between (a) a masked current feature map, the masked current feature map being the current feature map overlayed with the segmentation mask, the current feature map generated by the machine learning model based on the current version and (b) the target feature map of the current step, (ii) predicts, via the machine learning model, a current amount of noise in the optimized iterate, and (iii) generates a next version using the current amount of noise and the optimized iterate; and wherein the synthetic image displays the object with a new defect, the new defect including a combination of a rendition of the first defect and a rendition of the second defect.

12. The computer-implemented method of claim 11, wherein a size of the first defect is larger than a size of the second defect.

13. The computer-implemented method of claim 11, wherein the machine learning model is a Text-to-Image Diffusion Model.

14. The computer-implemented method of claim 11, wherein:

the machine learning model includes a finetuned U-Net; and the source feature map is extracted from ResNet layers of the finetuned U-Net during each step of the forward diffusion process.

15. The computer-implemented method of claim 11, wherein the target feature map is generated by a convex combination of the first masked feature map and the second masked feature map.

16. The computer-implemented method of claim 11, further comprising:

extracting an input feature map that is generated by the machine learning model during the forward diffusion process;

generating a complement mask that is a logical complement of the first segmentation mask;

generating a complement feature map by overlaying the complement mask on the input feature map; and generating a current result by overlaying the complement mask on the current feature map, wherein, the energy function is a sum of the first energy component and a second energy component, and the second energy component compares differences between (i) the current result and (ii) the complement feature map.

17. The computer-implemented method of claim 11, wherein the energy function is minimized over a predetermined number of iterations to generate the optimized iterate.

18. The computer-implemented method of claim 11, wherein:

the first predetermined value is greater than zero; and the second predetermined value is zero.

19. The computer-implemented method of claim 11, wherein the first defect is a different type of physical flaw on the object than the second defect.

20. The computer-implemented method of claim 11, further comprising:

receiving a set of transformations to be applied when generating the new defect; and applying the set of transformations to the first source image, the first segmentation mask, the second source image, and the second segmentation mask before generating the first source feature map and the second source feature map such that the first source feature map and the second source feature map are generated with the set of transformations via the first source image the second source image, wherein the synthetic image displays the new defect with the set of transformations.

* * * * *